US011841439B2

(12) United States Patent
Armstrong-Crews et al.

(10) Patent No.: US 11,841,439 B2
(45) Date of Patent: Dec. 12, 2023

(54) POINT CLOUD SEGMENTATION USING A COHERENT LIDAR FOR AUTONOMOUS VEHICLE APPLICATIONS

(71) Applicant: Waymo LLC, Mountain View, CA (US)

(72) Inventors: Nicholas Armstrong-Crews, Mountain View, CA (US); Mingcheng Chen, Sunnyvale, CA (US); Xiaoxiang Hu, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 456 days.

(21) Appl. No.: 17/087,464

(22) Filed: Nov. 2, 2020

(65) Prior Publication Data

US 2022/0137227 A1    May 5, 2022

(51) Int. Cl.
*G01S 17/931* (2020.01)
*G01S 17/58* (2006.01)
(Continued)

(52) U.S. Cl.
CPC .......... *G01S 17/931* (2020.01); *B60W 30/09* (2013.01); *B60W 30/0956* (2013.01);
(Continued)

(58) Field of Classification Search
CPC ........ G01S 17/931; G01S 17/89; G01S 17/42; G01S 17/58; G01S 7/4802; G01S 7/4808;
(Continued)

(56) References Cited

U.S. PATENT DOCUMENTS 8,112,223 B2  2/2012 Jordan et al.
9,851,470 B2  12/2017 Henderson
(Continued)

FOREIGN PATENT DOCUMENTS

EP  3367121 A1    8/2018
EP  3525000 A1 *  8/2019  ............. G01S 13/42
(Continued)

OTHER PUBLICATIONS

International Search Report and Written Opinion dated Feb. 18, 2022, on application No. PCT/US2021/057622, 12 pages.
(Continued)

*Primary Examiner* — Michael P Stafira
(74) *Attorney, Agent, or Firm* — Lowenstein Sandler LLP

(57) ABSTRACT

Aspects and implementations of the present disclosure address shortcomings of the existing technology by enabling Doppler-assisted segmentation of points in a point cloud for efficient object identification and tracking in autonomous vehicle (AV) applications, by: obtaining, by a sensing system of the AV, a plurality of return points comprising one or more velocity values and one or more coordinates of a reflecting region that reflects a signal emitted by the sensing system, the one or more velocity values and the one or more coordinates obtained for the same instance of time, identifying that the set of the return points is associated with an object in an environment, and causing a driving path of the AV to be determined in view of the object.

20 Claims, 12 Drawing Sheets

(51) Int. Cl.
*G01S 17/89* (2020.01)
*B60W 60/00* (2020.01)
*B60W 30/09* (2012.01)
*B60W 30/095* (2012.01)
*G01S 17/06* (2006.01)
*G01S 17/50* (2006.01)
*G01S 17/04* (2020.01)

(52) U.S. Cl.
CPC ........... *B60W 60/001* (2020.02); *G01S 17/06* (2013.01); *G01S 17/50* (2013.01); *G01S 17/58* (2013.01); *G01S 17/89* (2013.01); *B60W 2420/52* (2013.01); *B60W 2554/20* (2020.02); *B60W 2554/4029* (2020.02); *G01S 17/04* (2020.01)

(58) Field of Classification Search
CPC ...... G01S 13/931; G01S 17/46; G01S 7/4815; G01S 17/10; G01S 17/894; G01S 17/93; G01S 7/4817; G01S 7/4816; G01S 17/18; G01S 7/484; G01S 17/34; G01S 7/4814; G01S 7/4868; G01S 17/006; G01S 17/66; G01S 7/4861; G01S 7/4863; G01S 13/865; G01S 17/86; G01S 17/933; G01S 7/483; G01S 13/42; G01S 17/06; G01S 17/50; G01S 17/87; G01S 7/497; G01S 13/584; G01S 13/867; G01S 17/36; G01S 2013/93274; G01S 7/03; G01S 7/282; G01S 7/35; G01S 7/40; G01S 7/415; G01S 7/4917; G01S 13/52; G01S 13/589; G01S 13/726; G01S 13/89; G01S 13/933; G01S 17/48; G01S 17/90; G01S 17/95; G01S 2013/9323; G01S 7/00; G01S 7/2955; G01S 7/411; G01S 7/412; G01S 7/486; G01S 7/4865; G01S 7/4915; G01S 13/74; G01S 13/937; G01S 17/04; G01S 2007/4975; G01S 5/02; G01S 7/292; G01S 7/4039; G01S 7/417; G01S 7/487; G01S 13/426; G01S 13/505; G01S 13/862; G01S 13/878; G01S 17/26; G01S 2013/9321; G01S 2013/9327; G01S 7/354; G01S 7/356; G01S 7/41; G01S 7/4804; G01S 7/539; G01S 13/02; G01S 13/58; G01S 13/582; G01S 13/72; G01S 13/723; G01S 13/765; G01S 13/86; G01S 13/88; G01S 15/93; G01S 17/08; G01S 17/32; G01S 17/88; G01S 2013/9316; G01S 2013/932; G01S 2013/9322; G01S 2013/9325; G01S 2013/93273; G01S 2013/93277; G01S 5/01; G01S 5/017; G01S 5/0268; G01S 7/027; G01S 7/2833; G01S 7/4008; G01S 7/4034; G01S 7/4811; G01S 7/4818; G01S 7/4911; G01S 7/4913; G01S 7/4972; G01S 2013/93271; G01S 11/14; G01S 5/14; G01S 5/18; G01S 5/30; G01S 5/12; G01S 7/4026; G01S 19/235; G01S 11/10; G01S 13/87; G01S 7/51; G01S 13/34; G01S 13/343; G01S 13/583; G01S 13/872; G01S 13/91; G01S 13/951; G01S 2013/916; G01S 2013/9318; G01S 2013/93185; G01S 2205/008; G01S 5/0246; G01S 7/4914; G01S 13/48; G01S 13/70; G01S 15/931; G01S 19/09; G01S 13/003; G01S 15/02; G01S 15/58; G01S 15/582; G01S 15/62; G01S 15/88; G01S 19/12; G01S 19/23; G01S 19/29; G01S 2013/9315; G01S 2013/9319; G01S 5/0027; G01S 5/0226; G01S 5/0257; G01S 7/295; G01S 7/4862; G01S 13/347; G01S 13/5242; G01S 13/62; G01S 13/874; G01S 19/34; G01S 19/48; G01S 19/49; G01S 3/74; G01S 5/0009; G01S 5/0036; G01S 5/0284; G01S 7/006; G01S 7/025; G01S 7/2923; G01S 7/4052; G01S 7/4056; G01S 7/4091; G01S 1/042; G01S 13/06; G01S 13/10; G01S 13/282; G01S 13/3215; G01S 13/60; G01S 13/9027; G01S 19/14; G01S 19/20; G01S 2013/0245; G01S 5/00; G01S 5/021; G01S 5/0247; G01S 5/0289; G01S 5/0294; G01S 5/06; G01S 5/10; G01S 7/003; G01S 7/022; G01S 7/024; G01S 7/298; G01S 7/403; G01S 7/4912; G01S 7/499; G01S 11/08; G01S 13/00; G01S 13/08; G01S 13/44; G01S 13/4454; G01S 13/524; G01S 13/536; G01S 13/587; G01S 13/66; G01S 13/825; G01S 15/66; G01S 19/01; G01S 19/26; G01S 2013/466; G01S 2015/933; G01S 2205/01; G01S 5/0221; G01S 7/023; G01S 7/2921; G01S 7/4004; G01S 7/42; G01S 7/48; G01S 7/52004; B60W 2420/52; B60W 2420/42; B60W 60/001; B60W 60/00276; B60W 2554/00; B60W 2554/4029; B60W 30/095; B60W 30/10; B60W 40/02; B60W 2556/10; B60W 30/08; B60W 30/0956; B60W 50/06; B60W 60/0011; B60W 60/00272; B60W 2050/0088; B60W 2050/0083; B60W 2552/00; B60W 2554/20; B60W 2554/402; B60W 2554/404; B60W 30/09; B60W 60/0015; B60W 60/0027; B60W 2554/4041; B60W 2555/20; B60W 30/14; B60W 30/143; B60W 2050/065; B60W 2520/10; B60W 2552/50; B60W 2554/40; B60W 2554/4044; B60W 2554/4045; B60W 2554/804; B60W 2556/45; B60W 2556/50; B60W 2556/60; B60W 2720/103; B60W 30/16; B60W 40/00; B60W 40/04; B60W 40/105; B60W 50/00; B60W 50/14; B60W 60/00274; B60W 2050/0005; B60W 2050/0013; B60W 2050/0057; B60W 2050/0075; B60W 2050/009; B60W 2400/00; B60W 2420/00; B60W 2520/00; B60W 2520/06; B60W 2552/10; B60W 2554/4026; B60W 2554/4042; B60W 2554/4048; B60W 2554/4049; B60W 2554/80; B60W 2554/801; B60W 2554/803; B60W 2556/35; B60W 2556/65; B60W 2710/0605; B60W 2710/18; B60W 2710/20; B60W 2720/24; B60W 30/00; B60W 30/02; B60W 30/025; B60W 30/0953; B60W 30/12; B60W 30/18009; B60W 30/18109; B60W 30/18154; B60W 40/072; B60W 40/08; B60W 40/10; B60W 50/0097; B60W 50/0098; B60W 60/00; B60W 60/0025; B60W 2754/00; B60W 40/06; B60W 2300/12; B60W 2300/125; B60W 2510/222; B60W 2554/406; B60W 30/18163; B60W 40/12; B60W 60/00182; B60W 10/18; B60W 2050/0052; B60W 2420/40; B60W 2552/05; B60W 2552/53; B60W 60/0016; B60W 2040/0872; B60W 2050/143; B60W 2530/10; B60W 2540/00; B60W 2540/229; B60W 30/06; B60W 40/09

See application file for complete search history.

(56) References Cited

U.S. PATENT DOCUMENTS

| | | | |
|---|---|---|---|
| 10,262,234 | B2 | 4/2019 | Li et al. |
| 10,884,422 | B2* | 1/2021 | Zhang .................... G08G 1/166 |
| 11,029,395 | B1 | 6/2021 | Barber et al. |
| 11,448,735 | B2 | 9/2022 | O'Keeffe |
| 2005/0285774 | A1 | 12/2005 | Wittenberg et al. |
| 2007/0219720 | A1 | 9/2007 | Trepagnier et al. |
| 2014/0347207 | A1* | 11/2014 | Zeng .................... G01S 13/931 342/70 |
| 2015/0198711 | A1* | 7/2015 | Zeng .................. G01S 13/9029 342/59 |
| 2018/0136321 | A1 | 5/2018 | Verghese et al. |
| 2018/0335787 | A1* | 11/2018 | Zeng .................... G05D 1/0214 |
| 2019/0011541 | A1 | 1/2019 | O'Keeffe |
| 2019/0079193 | A1* | 3/2019 | Gunnam ............... G01S 7/4808 |
| 2019/0120955 | A1* | 4/2019 | Zhong .................... G01S 13/584 |
| 2019/0138822 | A1 | 5/2019 | Yao et al. |
| 2019/0302767 | A1* | 10/2019 | Sapp .................... G05D 1/0246 |
| 2019/0317219 | A1* | 10/2019 | Smith .................. G01S 17/931 |
| 2019/0318206 | A1* | 10/2019 | Smith .................... G06N 3/045 |
| 2020/0182992 | A1 | 6/2020 | Kellner et al. |
| 2020/0201351 | A1* | 6/2020 | Armstrong-Crews ....................... B60W 10/20 |
| 2020/0301013 | A1 | 9/2020 | Banerjee et al. |
| 2020/0302237 | A1 | 9/2020 | Hennings Yeomans et al. |
| 2020/0371228 | A1* | 11/2020 | Wang .................... G06V 20/56 |
| 2020/0398894 | A1 | 12/2020 | Hudecek et al. |
| 2020/0400821 | A1 | 12/2020 | Baker et al. |
| 2021/0001868 | A1 | 1/2021 | Ahn |
| 2021/0024069 | A1 | 1/2021 | Herman |
| 2021/0056713 | A1 | 2/2021 | Rangesh |
| 2021/0141092 | A1 | 5/2021 | Chen et al. |
| 2021/0173055 | A1 | 6/2021 | Jian et al. |
| 2021/0229657 | A1 | 7/2021 | Herman et al. |
| 2021/0261152 | A1 | 8/2021 | Meijburg et al. |
| 2021/0339738 | A1 | 11/2021 | Ashkari et al. |
| 2021/0396887 | A1 | 12/2021 | Schmalenberg |
| 2022/0058402 | A1 | 2/2022 | Hunt |
| 2022/0119002 | A1 | 4/2022 | Ladd |
| 2022/0122363 | A1 | 4/2022 | Liong et al. |
| 2022/0128995 | A1* | 4/2022 | Chen ....................... G01S 17/66 |
| 2022/0146676 | A1* | 5/2022 | Armstrong-Crews ....................... G01S 17/89 |
| 2022/0229164 | A1 | 7/2022 | Steinberg et al. |
| 2022/0276375 | A1 | 9/2022 | Armstrong-Crews |

FOREIGN PATENT DOCUMENTS

| | | | | |
|---|---|---|---|---|
| EP | 3745158 | A1 * | 12/2020 | ............ B60W 40/04 |
| JP | 2015035019 | A | 2/2015 | |
| KR | 20200011813 | A | 2/2020 | |
| WO | 2018127789 | A1 | 7/2018 | |
| WO | WO-2020210276 | A1 * | 10/2020 | ............. G01S 17/10 |
| WO | WO-2022087308 | A1 * | 4/2022 | ............. G01S 17/34 |
| WO | WO-2022094429 | A1 * | 5/2022 | ........ B60W 60/0011 |

OTHER PUBLICATIONS

International Search Report and Written Opinion dated Feb. 15, 2022, on application No. PCT/US2021/056105, 10 pages.
International Search Report and Written Opinion dated Feb. 23, 2022, on application No. PCT/US2021/057623, 10 pages.
AEYE iDAR "iDAR is Smarther than LiDAR", aeye.ai/idar/, retrieved Oct. 20, 2020, 11 pages.
Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D Fmcw Lidar-on-chip for Autonomous Driving; Recent Porsche Investment", greecarcongress.com/2019/12/20191212.aeva.html, Dec. 12, 2019, 11 pages.

* cited by examiner

POINT CLOUD SEGMENTATION USING A COHERENT LIDAR FOR AUTONOMOUS VEHICLE APPLICATIONS

TECHNICAL FIELD

The instant specification generally relates to autonomous vehicles. More specifically, the instant specification relates to improving autonomous driving systems and components using velocity sensing data to assist in point cloud segmentation in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend significantly on timely and accurate identification of various objects present in the driving environment and on the ability of a driving algorithm to quickly and efficiently process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1A:
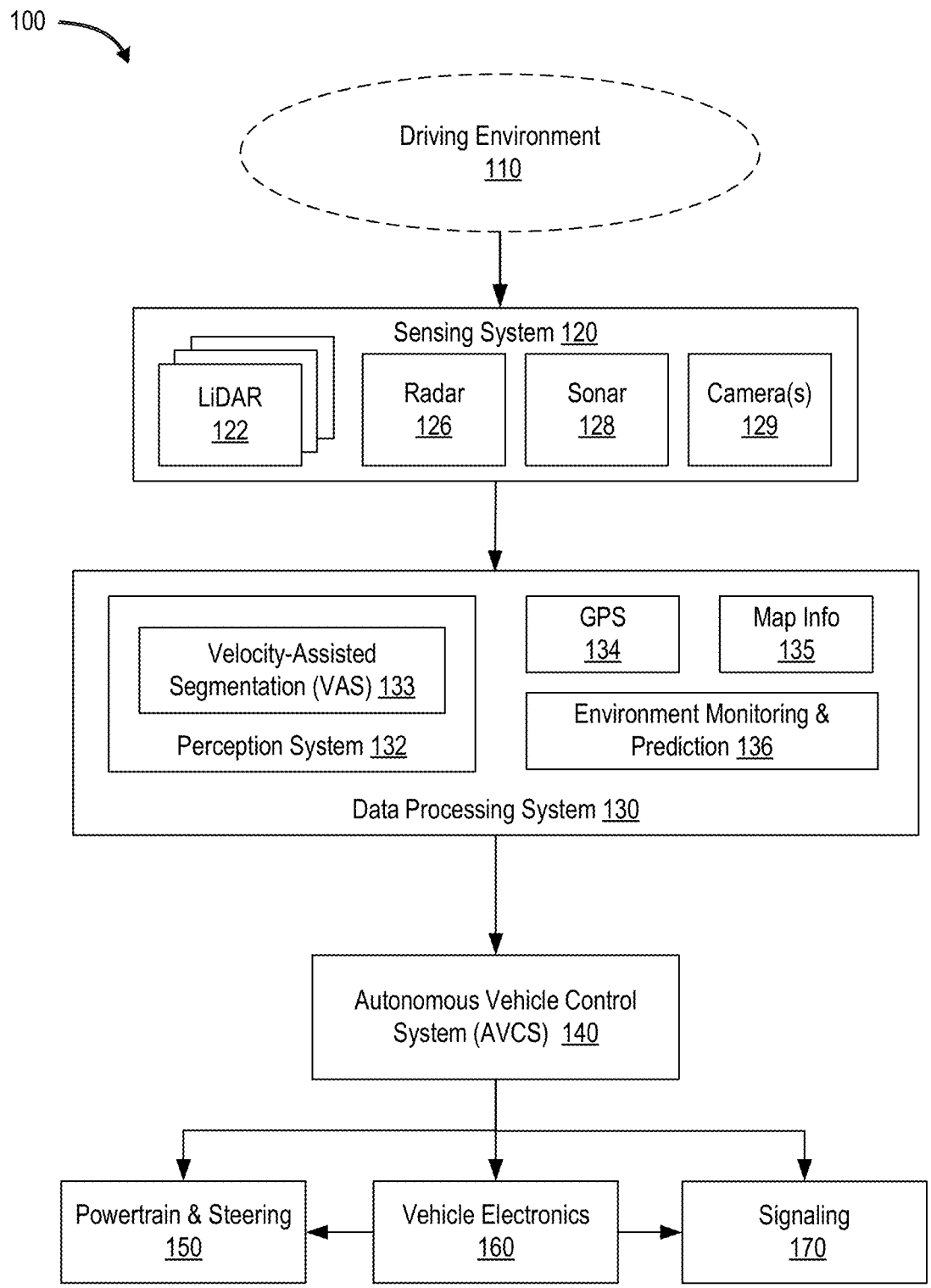
FIG. 1A is a diagram illustrating components of an example autonomous vehicle that uses Doppler-assisted segmentation of point clouds for object identification and tracking, in accordance with some implementations of the present disclosure.

In one implementation, disclosed is a method of obtaining, by a sensing system of an autonomous vehicle (AV), a plurality of return points, each return point comprising one or more velocity values and one or more coordinates of a reflecting region that reflects a signal emitted by the sensing system, the one or more velocity values and the one or more coordinates obtained for a same first sensing frame, identifying, in view of the one or more velocity values of each of a first set of the return points of the plurality of return points, that the first set of the return points is associated with a first object in an environment of the AV, and causing a driving path of the AV to be determined in view of the first object.

In another implementation, disclosed is a system that includes a sensing system of an autonomous vehicle (AV) to obtain a plurality of return points, each return point comprising one or more velocity values and one or more coordinates of a reflecting region that reflects a signal emitted by the sensing system, the one or more velocity values and the one or more coordinates obtained for a same first sensing frame. The disclosed system further includes a perception system of the AV to identify, in view of the one or more velocity values of each of a first set of the return points of the plurality of return points, that the first set of the return points is associated with a first object in an environment of the AV, and cause a driving path of the AV to be determined in view of the first object.

In another implementation, disclosed is a non-transitory computer-readable medium having instructions stored thereon that, when executed from a computing device, cause the computing device to obtain, by a sensing system of an autonomous vehicle (AV), a plurality of return points, each return point comprising one or more velocity values and one or more coordinates of a reflecting region that reflects a signal emitted by the sensing system, the one or more velocity values and the one or more coordinates obtained for a same first sensing frame, identify, in view of the one or more velocity values of each of a first set of the return points of the plurality of return points, that the first set of the return points is associated with a first object in an environment of the AV, and cause a driving path of the AV to be determined in view of the first object.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover an entire 360-degree view by scanning to collect in a series of consecutive frames identified with timestamps. As a result, each sector in space is sensed in time increments $\Delta \tau$, which are determined by the angular velocity of the lidar's scanning speed. "Frame" or "sensing data frame," as used herein, can refer to the entire 360-degree view of the environment obtained over one revolution of the transmitter or, alternatively, to any smaller sector, e.g., a 1-degree, 5-degree, a 10-degree, or any other angle obtained over a fraction of the scan cycle (revolution), or over a scan designed to cover a limited angle.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points can be rendered or otherwise associated with a frame and sometimes referred to as a "point cloud." A point cloud can include returns from multiple objects. Typically, it is not known a priori how many objects are within a given frame. A single object, such as another vehicle, a road sign, a pedestrian, and so on, can generate multiple return points. For example, a 10-degree frame can include returns from one or more road signs, multiple vehicles located at various distances from the lidar device (which may be mounted on the autonomous vehicle) and moving with different speeds in different directions, a pedestrian crossing a roadway, walking along a sidewalk, or standing by the roadside, and many other objects. Segmenting (which can be performed by a perception system of the autonomous vehicle) a given point cloud into clusters that correspond to different objects can be useful in autonomous driving applications. Points that are close (e.g., are separated by a small angular distance and correspond to reflections from similar distances) can nonetheless belong to different objects. For example, a traffic sign and a pedestrian standing close to the sign can generate close return points. Similarly, a car moving along a bicycle in an adjacent lane can generate close return points. Accordingly, methods of segmentation that rely on geometric proximity of points are prone to combining into a single cluster points that in fact belong to different objects. Conversely, objects that consist of spatially separated parts (e.g., a truck hauling a trailer using a long connection) can be identified as consisting of separate clusters even though the parts belong to the same vehicle and move together with similar velocities.

ToF lidars are typically used for ranging. ToFs can also be capable of determining the velocity (speed and direction of motion) of a return point by emitting two or more signals (as part of different sensing frames) in a quick succession and detecting the position of the reflecting surface as the surface moves between each additional frame. The intervals between successive signals can be short enough so that between consecutive signals (frames) the object does not change its position appreciably in relation to other objects of the environment, but still long enough to allow the lidar to accurately detect the changes in the object's position. However, ToF lidar devices are generally incapable of determining velocities of objects based on a single sensing frame.

Aspects and implementations of the present disclosure address these and other shortcomings of the existing technologies by enabling methods of Doppler-assisted segmentation, using velocity sensing data, for various moving objects present in environments of the autonomous vehicles. Specifically, coherent lidars take advantage of a phase information encoded into transmitted signals and carried by the emitted electromagnetic waves to the target and back and provide additional functionality unavailable in the standard ToF lidar technology. A coherent lidar detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent lidar allows, in addition to obtaining the range information, to associate a radial velocity with the return points of the point cloud (radial velocimetry). This additional information, as described in more detail below, enables efficient segmentation of point clouds into clusters corresponding to different objects. In particular, objects that are closely positioned in space but have different velocities (e.g., a bicycle and a road sign, a moving car and a parked car, etc.) can have distinct radial velocity signatures that can help with the segmentation process. Additionally where purely geometric segmentation algorithms would likely segment a large object into multiple objects (e.g., classifying a truck with a trailer into two clusters), Doppler-assisted segmentation can be capable of correctly identifying (based on a single frame) extended parts of the point clouds as belonging to a single cluster (associated with a single object). For example, a motion of a rigid body (such as a body of a car, a truck, an airplane, etc.) can be constrained by the condition that a distance between two arbitrarily chosen points of the body remains fixed (constant) over the course of the body's motion. As a consequence, a motion of a rigid body can be characterized as a combination of a translational motion, which can be described by a translational vector velocity $\vec{V}$ (hereinafter, "velocity") and a rotational motion, which can be described by an angular velocity $\vec{\Omega}$ (hereinafter, "angular velocity"). In the most general case, the two vector velocities amount to six values, e.g., three components of the velocity $\vec{V}=(V_x, V_y, V_z)$ and three components of the angular velocity $\vec{\Omega}=(\Omega_x, \Omega_y, \Omega_z)$, in Cartesian coordinates (or, alternatively, cylindrical, spherical, or any other system of coordinates). As disclosed below, a significant information about the velocities can be determined based on even a single frame of the sensing system of the AV. Such a single frame can include a mesh of return points corresponding to reflection of different sensing signals, each return point ("point") P including known coordinates (e.g., known from the directional data of the lidar transmitter and the range data extracted from ToF of the reflected sensing signals) and a radial velocity component (herein "radial velocity") $V_r(P)$ of the reflecting surface corresponding to each point P (e.g., extracted by a coherent lidar sensor from Doppler frequency/phase shifts of the reflected signals). In some implementations disclosed, segmentation can be facilitated by fitting the coordinates and the radial velocity of various points to a rigid body equation parameterized by $\vec{V}$ and $\vec{\Omega}$. For example, a hypothesis can be formed that a certain cluster of points corresponds to a single object. Successful fitting of the coordinates and radial velocities of the selected cluster to a rigid-body equation can indicate that the selected hypothesis is likely to be true. Unsuccessful fitting, on the other hand, can disprove the selected hypothesis. As a result, the hypothesis can be discarded or modified. For example, some points can be dropped (pruned) from the selected cluster and the fitting can be repeated. In some implementations, clustering can be performed by various clustering methods (e.g., K-means clustering) in a multi-dimensional space (feature space) where each point P is identified by a vector $\hat{P}=(X, Y, Z, V_r)$ comprising three (or two, in cases of motion of a given surface) spatial coordinates X, Y, Z and the radial velocity $V_r$. Additional dimensions of the multi-dimensional feature space can include intensity values, lateral velocities (e.g., determined by additional sensors, as described below, or via fitting to the rigid body equation), and so on.

In some instances, an object can perform a type of a motion that imparts no radial velocity (or little radial velocity) to various regions of the object. For example, a car can be moving in a lateral direction or a wheel can be spinning within a plane that is perpendicular to the line of view from the sensor system, leaving no distinct signature of the radial velocities. In such instances, segmentation can be augmented by additional sensing frames corresponding to other cycles (revolutions) of the transmitter at different (e.g., later or earlier) instances of time, to enable detection of the lateral displacement of the point cloud with time.

The disclosed implementations also enable segmentation of points into subsets (sub-clusters) that belong to separate objects. For example, an unsuccessful fitting (e.g., a fitting with below a target accuracy) of a set of points {P} using a single velocity $\vec{V}$ and a single angular velocity $\vec{\Omega}$ can indicate that the set of points actually belong to multiple objects. Splitting the set {P} into subsets {$P_1$}, {$P_2$}, {$P_3$} . . . and fitting each subset with a separate pair of velocities, e.g., ($\vec{V}_1, \vec{\Omega}_1$), ($\vec{V}_2, \vec{\Omega}_2$), ($\vec{V}_3, \vec{\Omega}_3$) . . . , if achieved within the target accuracy, can be used for segmentation of points and subsequent identification of multiple objects present in the environment. Doppler-assisted segmentation can be used both for formation of hypotheses and for verification of the formed hypotheses. For example, a hypothesis that was formed based on a single sensing frame can be tested (evaluated) when the second sensing frame data is collected: the velocity and coordinates of the points in the second frame can be fit using the same pairs ($\vec{V}_k, \vec{\Omega}_k$) or pairs having close values for frames closely-spaced in time, in order to allow accounting for linear $\Delta \vec{V}_k/\Delta\tau$ and angular $\Delta\vec{\Omega}_k/\Delta\tau$ accelerations. Additionally, if multiple frames are available, the distances actually travelled by various points of the hypothesized objects can be compared to the displacements predicted to occur between the frames based on the identified velocities ($\vec{V}_1, \vec{\Omega}_1$), ($\vec{V}_2, \vec{\Omega}_2$), ($\vec{V}_3, \vec{\Omega}_3$) A segmentation hypothesis can be discarded if the mismatch between the predicted displacements and the actual displacements is above a certain predetermined limit. Alternatively, matching the actual motion to the predicted motion within a target accuracy can be used to affirm the hypothesis. Once one or more objects are identified, velocity sensing data can be continued with the subsequent frames used for tracking of the identified objects. During formation of hypotheses, points can be broken into smaller clusters, the fitting can be performed, with more points then added to the smaller clusters as long as the added points fit (with a target accuracy) the same sets of velocity parameters ($\vec{V}_1, \vec{\Omega}_1$), ($\vec{V}_2, \vec{\Omega}_2$), ($\vec{V}_3, \vec{\Omega}_3$) . . . , until all (or a majority) of points in the point cloud is segmented into various clusters.

FIG. 1A is a diagram illustrating components of an example autonomous vehicle (AV) 100 that uses Doppler-assisted segmentation of point clouds for object identification and tracking, in accordance with some implementations of the present disclosure. FIG. 1A illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on.

For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 scan 360-degree, such as in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operates at generally in the near-infrared wavelength, but may include sensing technology that operates at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 120 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the lidar data, the perception system 132 can determine the distance from the rock to the AV and, therefore, by combining the distance information with the angular size of the rock, the perception system 132 can determine the linear dimensions of the rock as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can have a velocity-assisted segmentation (VAS) module 133. VAS module 133 can receive one or more sensor data frames from the sensing system 120. Each of the sensor frames can include multiple points. Each point can correspond to a reflecting surface from which a signal emitted by the sensing system 120 (e.g., by lidar sensor(s) 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the lidar data whereas the angles can be independently known from a synchronizer data, a clock data, e.g., based on the known scanning frequency within the horizontal plane. The velocity data can be provided to VAS module 133 by lidar sensor(s) 122, in one implementation, based on Doppler-assisted sensing technology. VAS module 133 can use one or more algorithms to perform segmentation of points using velocity data, as described in more detail below. The Doppler-assisted segmentation can then be used by the perception system 132 for efficient and reliable detection and tracking of objects.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1A. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 1B:
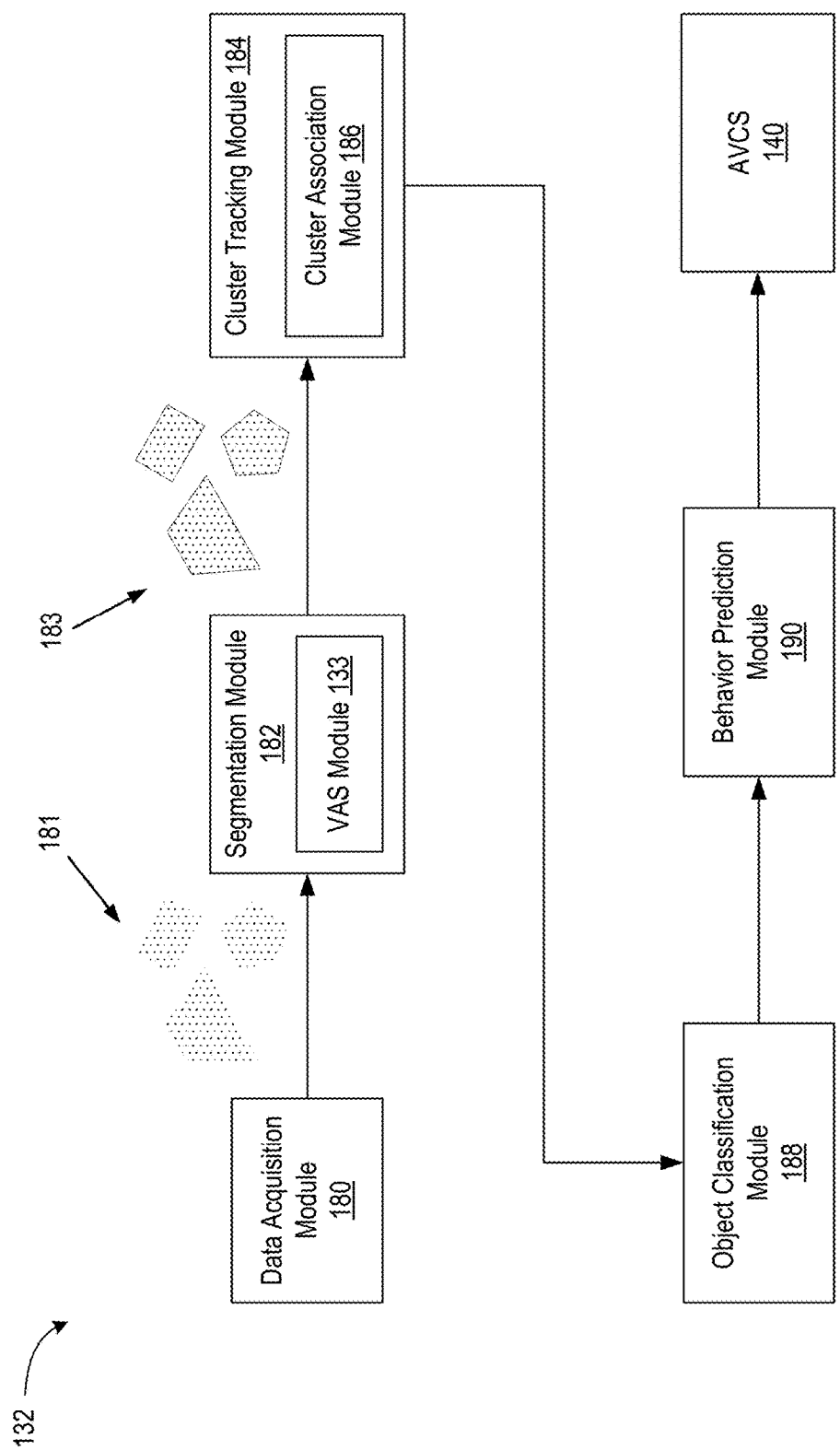
FIG. 1B is a diagram illustrating example architecture of a perception system of the autonomous vehicle of FIG. 1A that uses Doppler-assisted segmentation of point clouds for object identification, in accordance with some implementations of the present disclosure

FIG. 1B is a diagram illustrating example architecture of a perception system of the autonomous vehicle of FIG. 1A that uses Doppler-assisted segmentation of point clouds for object identification, in accordance with some implementations of the present disclosure. A perception system illustrated in FIG. 1B can be perception system 132 of FIG. 1A, in one implementation. An input into perception system 132 may be data obtained by sensing system 120, including distance data and radial velocity data obtained by lidar sensor(s) 122. For example, a data acquisition module 180 may associate each (return) point with coordinates and radial velocities of the respective reflecting region. Various points may correspond to different frames, each frame having a timestamp. In some implementations, to account for a rolling shutter that outputs sensing signals sequentially around the field of view, data acquisition block 180 may associate an individual time stamp with each point, by modifying a global reference timestamp of the respective frame with a time correction within a given frame. Output of data acquisition module 180 can be a point cloud 181 of points corresponding to a sensing frame or a portion of such a frame. Point cloud 181 can be input into a segmentation module 182 where various points of point cloud 181 can be grouped into clusters 183 corresponding to different objects. Segmentation can be performed using a variety of approaches. Clusters can be grouped based on proximity of points in space, proximity of radial velocities of various points, or both. In some implementations, segmentation can use various mapping algorithms (such as ICP) that are capable of mapping points of two different sensing frames. Segmentation can involve formation and verification of hypotheses; for example, a hypothesis that a certain cluster corresponds to a single object can be confirmed or disproved based on distribution of measured (radial) velocities of the points in the cluster, on evolution of the cluster between different sensing frames, and/or by other methods and techniques. In some implementations, velocity estimation can be performed by VAS module 133, as disclosed in more detail below. Segmentation can involve fitting radial velocities and coordinates of various points in hypothesized clusters using rigid-body equation (with one or more sets of translational $\vec{V}$ and rotational $\vec{\Omega}$ velocities, corresponding to various possible objects). Based on the results of the fitting, various hypotheses can be discarded, confirmed, accepted conditionally, subject to additional verification, and so on. Confirmed hypotheses (e.g., output clusters 183) can be provided to a cluster tracking module 184. Cluster tracking module 184 can track motion of the identified clusters 183. In some implementations, tracking of the motion of identified clusters 183 can involve tracking $\vec{V}(\tau)$ and $\vec{\Omega}(\tau)$ using multiple additional sensing frames with subsequent timestamps $\tau$ or can be performed based on a single sensing frame. In some implementations, segmentation based on identified $\vec{V}$ and $\vec{\Omega}$ can be used to track motion of the objects, using clusters of points from different sensing frames (sensing frames with different timestamps).

Perception system 132 can also use cluster association module 186 for object tracking. Cluster association module 186 can identify clusters belonging to different sensing frames as being associated with the same object, to facilitate tracking of the object's motion as a function of time. Using cluster associations, objects identified by cluster tracking module 184 may be classified by object classification module 188 as being of a particular type (class), such as cars, trucks, buses motorcycles, bicyclists, pedestrians, stationary objects, and so on. Object classification can be performed using various features of the tracked clusters, such as size, positions, velocity (both rotational and translational), pattern of motion (e.g., how often an object stops, how quickly an object accelerates/decelerates), motion in relation to other objects and so on. Based on classification of various objects by object classification module 188 as well as previously tracked motion of the objects (by cluster tracking module 184), a behavior prediction module 190 can forecast how the identified objects are likely to move within a certain time horizon, e.g., whether a truck is likely to stop before an intersection, cross the intersection without stopping, turn at the intersection, and so on. Behavior prediction module 190 can also forecast velocity and acceleration/deceleration of the identified objects, responses of the objects to changing traffic and road conditions, and so on. Information from (e.g., forecasts) from behavior prediction module 190 can be provided to AVCS 140 to enable driving path selection, as described above in relation to FIG. 1A.

Figure 2:
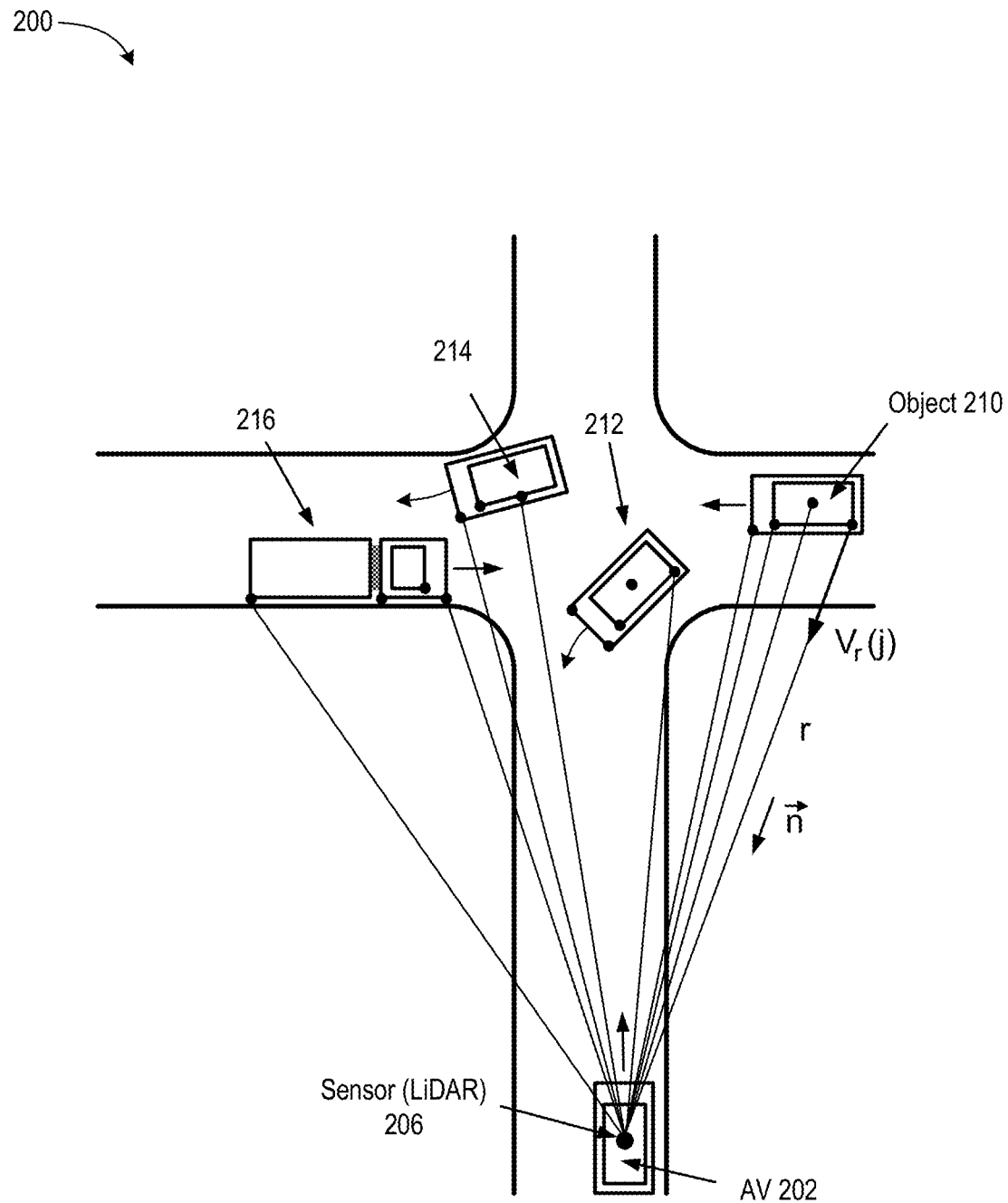
FIG. 2 is an illustration of a Doppler-assisted object identification and tracking setup that utilizes velocity reconstruction, as part of a perception system of an autonomous vehicle, in accordance with some implementations of the present disclosure.

FIG. 2 is an illustration 200 of a Doppler-assisted segmentation for object identification, as part of a perception system of an autonomous vehicle, in accordance with some implementations of the present disclosure. Depicted in FIG. 2 is AV 202 (which can be AV 100 or any other AV) approaching an intersection. The AV 202 has a sensor 206, which can be a lidar, such as a coherent lidar, an FMCW lidar, a hybrid coherent/ToF lidar, a combination of a coherent and incoherent lidar. etc., or any other device that allows to sense the radial velocity information in addition to the range (distance) information. The sensor 206 performs scanning of the driving environment of AV 202. In particular, the sensor 206 can sense multiple return points for each sensing frame. The sensing frames can be separated by time increments $\Delta\tau$. The time increments refer to time differentials between signals emitted into (or returned from) the same direction, as different directions can be probed with signals at slightly different times. More specifically, $\Delta\tau$ can be a duration of the sensor (e.g., lidar transmitter) cycle (e.g., a period of revolution of the sensor's transmitter); with N points around the full 360-degree horizontal view, so that any two adjacent directions of sensing can be probed with the time lead/lag of $\Delta\tau/N$.

An object 210 (e.g., a car, a truck, a bus, a motorcycle, or any other object) can be approaching the intersection from the right, as depicted in FIG. 2. Another object 212 (e.g., another car) can be making a left turn. An object 214 can be making a right turn, whereas an object 216 (e.g., a truck) can be approaching the intersection from the opposite direction.

Some objects (such as objects 212 and 214) can be performing a combination of a translational motion and a rotational motion, whereas other objects (such as objects 210 and 216) can be performing only translational motion. For example, object 212 can be rotating around some reference point O (not shown) with angular velocity $\vec{\Omega}$. In some implementations, e.g., in flat driving environments, it can be sufficient to describe rotational motion via a single-component angular velocity $\Omega$, but in non-flat 3D (in particular, flying or nautical) environments, the angular velocity can be a vector $\vec{\Omega}$ whose three components describe the rates of change of the pitch angle, yaw angle, and roll angle, respectively. The linear velocity $\vec{V}$ of the reference point similarly determines the rate at which the object is translating in space. Provided that the object 210 is rigid, the knowledge of the angular velocity $\vec{\Omega}$ and the linear velocity $\vec{V}$ of the reference point O (with coordinates $\vec{R}_O$) can uniquely determine the velocity of other points and assist with segmentation, as described in more detail below.

As shown in FIG. 2, various objects can reflect a number of signals (indicated, for illustration, by solid lines) output by the sensor 206 and generate a number of return points (shown with black circles). The return points should be understood as data entries (e.g., indexed by the angular directions of the output signals, or in any other way) generated by the perception system 132 based on the measurements performed by sensor 206, as part of the sensing system 120. Each return point can include: (1) distance r to the actual physical reflecting region, and (2) the radial velocity $V_r(j)$ that is equal to the component of the velocity $\vec{V}(j)$, associated with the j-th point. The radial velocity is the component of the vector velocity along the direction (described by unit vector $\vec{n}$) towards (or away from) the sensor 206: $V_r(j)=\vec{V}/(j)\cdot\vec{n}$. In some implementations, only some of the return points can include the radial velocity values. For example, while ToF range measurements can be performed for each return point, only some (e.g., every fifth, tenth, and so on) of the points can be probed with the coherent lidar and include the velocity data. The radial velocity $V_r(j)$ is the velocity measured in the reference frame of the AV 202. Accordingly, because in a general case the AV 202 is also moving, the measured velocity $V_r(j)$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.). Accordingly, it shall be assumed herein that various quantities (such as velocities and accelerations) are measured in the reference frame of the AV; the same quantities in any other reference frame (e.g., Earth frame) can then be obtained using appropriate transformation (e.g., Galilean transformations) to the other reference frame based on a known translational and rotational motion of the AV relative to the other reference frame.

As illustrated by FIG. 2, points belonging to a single object may have spatial separation that can be comparable to (or even less-more than) separation of points belonging to different objects. Accordingly, geometric segmentation based on distribution of points in space can be inefficient in many instances. It may, therefore, take multiple sensing frames before segmentation of points based on their time evolution can succeed. In contrast, implementations disclosed herein enable, in many instances, segmentation of points based already on a single frame, using distinct velocity signatures, identified by VAS module 133, that various objects can display.

Figure 3:
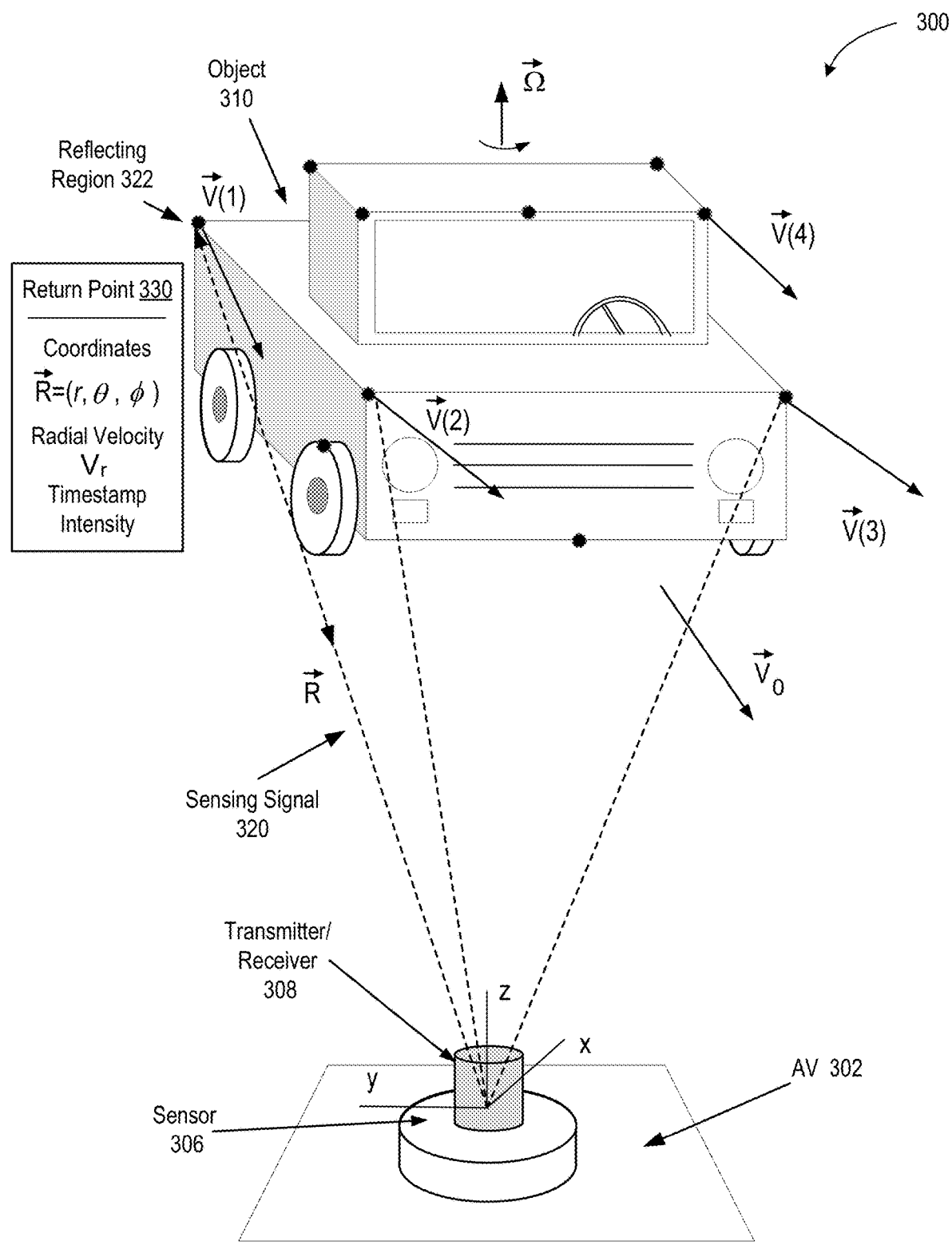
FIG. 3 is an illustration of a velocity sensing setup, as can be used by a perception system of an autonomous vehicle, in accordance with some implementations of the present disclosure.

FIG. 3 is an illustration 300 of a velocity sensing setup, as can be used by a perception system of an autonomous vehicle, in accordance with some implementations of the present disclosure. Depicted is an object 310 (e.g., a car, a truck, etc.) that is moving with some translational velocity $\vec{V}_O$ (e.g. moving forward) while simultaneously rotating with angular velocity $\vec{\Omega}$ (e.g., making a left turn). Also shown is a part of the AV 302 with a sensor 306 mounted thereon. Sensor 306 can include a scanning transmitter/receiver 308 capable of transmitting and receiving sensing (e.g., laser, radar, etc.) signals that probe the outside (relative to AV 302) environment. One sensing frame that corresponds to a single cycle of the transmitter 308 can produce multiple return points from various reflecting regions (depicted with black circles) of the object 310.

A sensing signal 320 can be emitted by a transmitting circuit of the transmitter/receiver 308, reflect from a reflecting region 322 of the object 310, return along the same path and be received by a receiving circuit of the transmitter/receiver 308. The sensing system 120 can associate a return point 330 with the sensing signal 320 and/or reflecting region 322. The return point 330 can include various data that can be extracted from the sensing signal 320, such as the coordinates (which can be in any appropriate system of coordinates, e.g., Cartesian coordinates $\vec{R}=(x, y, z)$, spherical coordinates $\vec{R}=(r, \theta, \phi)$, cylindrical coordinates $\vec{R}=(r, \phi, z)$, or any other system of coordinates; the origin of the coordinate system can be associated with the transmitter/receiver 308, as shown. The returns point can also include such data as the radial velocity $V_r$, a timestamp $\tau$ associated with the sensing signal 320 (e.g., the time of the signal emission or return), the intensity of the returned signal, and other information such as the polarization of the emitted and/or received signal, and the like. Although only the data associated with the return point 330 is depicted in FIG. 3, other return points associated with the reflecting regions depicted with black circles can include the same or similar type of information. Because the object 310 can be rotating, the velocities of each of the reflecting regions, $\vec{V}(1)$, $\vec{V}(2)$, $\vec{V}(3)$, $\vec{V}(4)$ ..., can be different from each other. Correspondingly, the detected radial velocities associated with each return point, $V_r(1)$, $V_r(2)$, $V_r(3)$, $V_r(4)$ ..., can likewise be different from each other. This difference in the detected radial velocities can be used by VAS module 133 for segmentation of point clouds into clusters corresponding to different objects.

Specifically, a cluster properly identified (segmented) as associated with an object (e.g., object 310) that is a rigid body, can be characterized by the velocity distribution is which an element of the object having a radius-vector $\vec{R}$ fits the rigid body equation:

$$\vec{V}=\vec{V}_O+\vec{\Omega}\times(\vec{R}-\vec{R}_O),$$

where $\vec{R}_O$ is the radius vector of some reference point. The reference point can be any element of the object, e.g. an element associated with the return point (3) or any other return point. The choice of the reference point O can be arbitrary since the same rigid body equation exists for any other reference point O', as $$\vec{V}=\vec{V}_O+\vec{\Omega}\times(\vec{R}-\vec{R}_{O'}-\vec{R}_O+\vec{R}_{O'})=\vec{V}_{O'}+\vec{\Omega}\times(\vec{R}-\vec{R}_{O'}),$$

where $\vec{V}_{O'}=\vec{V}_O+\vec{\Omega}\times(\vec{R}_{O'}-R_O)$ is the linear velocity of the other reference point O'. Although the linear velocity changes when the reference point is changed, the angular velocity is independent of the choice of the reference point. This independence provides additional flexibility by enabling to choose the reference point based on convenience (e.g., near the center of the cluster of points detected by the sensing system 120). Reference point O may be regarded as the center of object's rotation. A freedom to choose a reference point reflects a possibility to represent an arbitrary displacement of a rigid object via an infinite number of possible combinations of a rotations (about an arbitrarily chosen center of rotation but to the same angle and around the same axis) and a translation. (An exception is a purely translational motion.) Accordingly, in some implementations, it may be convenient to choose reference point O to be somewhere inside the object (albeit not necessarily chosen to be close to the object's geometric center or center of mass). In other implementations, it may be convenient to represent object's motion as a pure rotation around an axis parallel to $\vec{\Omega}$ (with no translations within the plane perpendicular to this axis) and a translation along this axis. Such choice of the rotation center (hereinafter referred to as "pure rotation" setup) is unique (up to arbitrary translation along the axis) and may be determined from the condition, $\vec{V}_O = \vec{V}_O + \vec{\Omega} \times (\vec{R}_{O'} - \vec{R}_O) = 0$, which gives $$\vec{R}_{O'} = C\vec{\Omega} + \frac{1}{\Omega^2}\left(\vec{\Omega} \times \vec{V}_O + \left(\vec{\Omega} \times \vec{R}_O\right) \times \vec{\Omega}\right),$$

where C is an arbitrary number. At small angular velocities (when the object performs mostly translational motion), as seen from the last expression, rotation center is located at large distances. Accordingly, for the sake of numerical accuracy, in some implementations, possible distances from an object to its center of rotation may be limited, e.g., a pure rotation setup may be changed to a combined rotational-translational setup once it is determined that the center of rotations is farther than some predetermined distance (e.g., a certain number of the object's longest dimension).

Figure 4A:
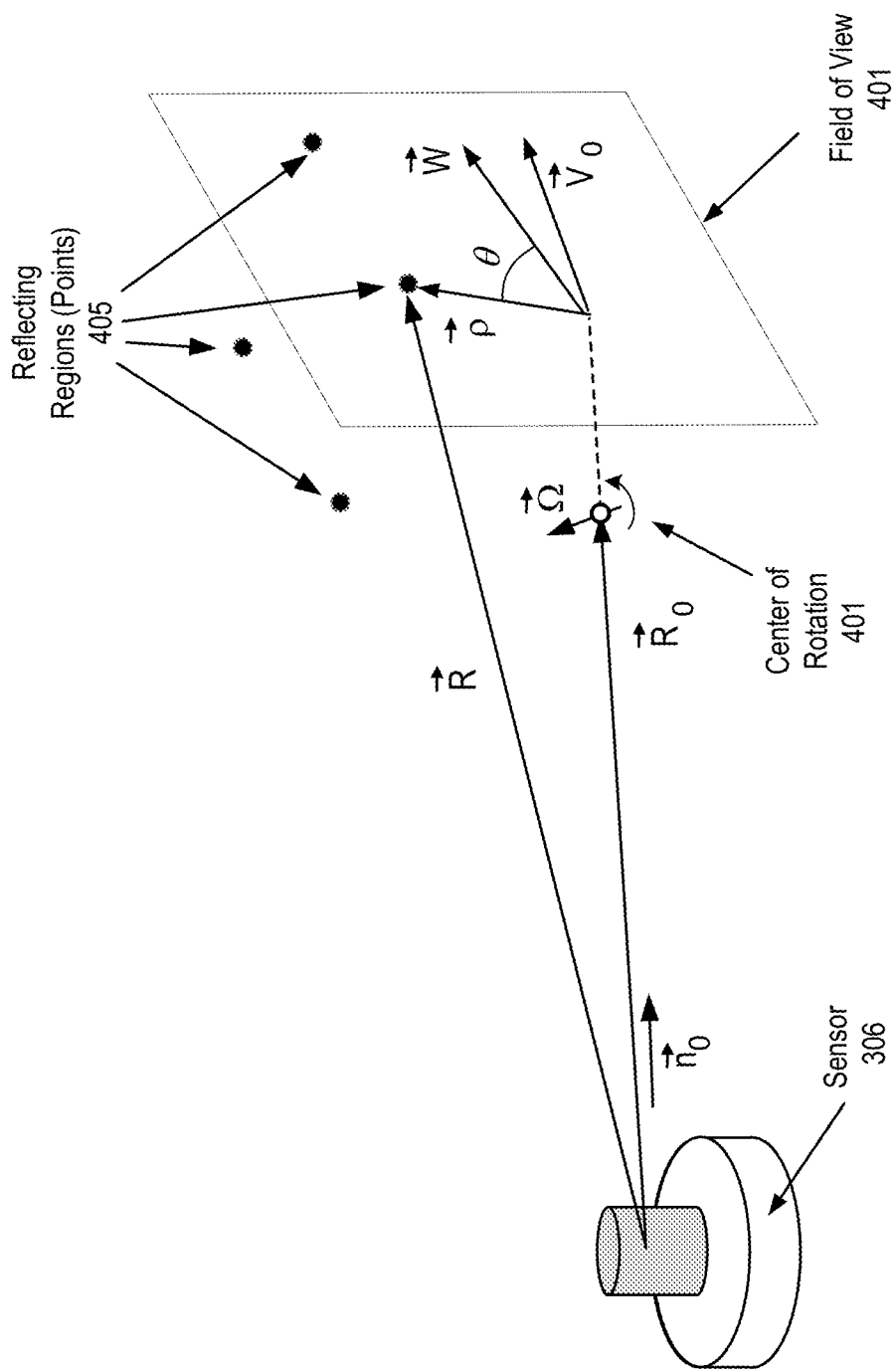
FIG. 4A illustrates a basic setup that can be used for forming geometric representations in relation to segmentation of a point cloud by a perception system of an autonomous vehicle, in accordance with some implementations of the present disclosure.

Segmentation of a point cloud can be performed using hypotheses formation and verification. As one example, the Doppler-assisted sensing can enable efficient generation of segmentation hypotheses based on a single sensing frame and the assumption that the sensing frame captures rigid objects (which is a reasonable assumption for many objects present in various autonomous driving environments). A rigid body can have a distinct velocity signature even when only the radial velocity component is known. In some implementations, cloud segmentation can be performed as illustrated in reference to FIGS. 4A-B. FIG. 4A illustrates a basic setup 400 that can be used for forming geometric representations in relation to segmentation of a point cloud by a perception system of an autonomous vehicle, in accordance with some implementations of the present disclosure. The perception system 132 and/or VAS module 133 can select a field of view 401 corresponding to a part of a sensing frame that includes multiple reflecting regions 405 giving rise to respective return points of the point cloud.

The following example refers to a coordinate system in which a point $\vec{R} = R\vec{n}_O + \vec{\rho}$ is identified by the radial distance R along the direction $\vec{n}_O$ towards the reference point $\vec{R}_O = R_O\vec{n}_O$ and by the lateral radius-vector $\vec{\rho} = (x, y, 0)$ that is perpendicular to the direction $\vec{n}_O = (0,0,1)$: $\vec{\rho} \cdot \vec{n}_O = 0$. The radial component of the velocity can be obtained by taking the scalar (dot) product of both sides of the rigid body equation with the unit vector in the direction of the sensing signal, $(R\vec{n}_O + \vec{\rho})/\sqrt{R^2 + \rho^2}$, and using the cyclic transformation of the triple product:

$$V_r = \vec{V}_O \cdot (R\vec{n}_O + \vec{\rho})/\sqrt{R^2 + \rho^2} + \left[\vec{\Omega} \times (\vec{n}_O(R - R_O) + \vec{\rho})\right] \cdot (R\vec{n}_O + \vec{\rho})/\sqrt{R^2 + \rho^2} = V_{Or} + \left(\vec{V}_{O\perp} + R_O\vec{n}_O \times \vec{\Omega}\right) \cdot \vec{\rho}/\sqrt{R^2 + \rho^2},$$

where $V_{Or} = \vec{V}_O \cdot \vec{n}_O R/\sqrt{R^2+\rho^2}$ is the radial component of the velocity of the reference point and $\vec{V}_{O\perp}$ is the lateral velocity of the reference point. For objects located at distances that are larger than their size, an acceptable accuracy and further simplification can be achieved by the approximation: $\sqrt{R^2+\rho^2} \neq R$. It now follows that the radial velocity field within a point cloud has a substantially (within the approximation of large R>>p) linear dependence on the in-plane (within the field of view) distance ρ to the reference point O:

$$V_r = V_{Or} + W\rho\cos\theta$$

where W is the magnitude of the in-plane vector $\vec{W} = (\vec{V}_{O\perp} + R_O\vec{n}_O \times \vec{\Omega})/R$, and θ is the angle that the in-plane vector p makes with vector W. Accordingly, the radial velocity field $V_r$ is a linear function of the coordinate along the direction of the in-plane vector W that is sensitive to both the lateral translational motion and the rotational motion of the rigid object. The vector $\vec{W}$ essentially represents a gradient of the radial velocity field projected onto the field of view: $\vec{W} = \nabla V_r$. Accordingly, subsets of points of the point cloud that are characterized by different directions of the vector W or by different absolute values of vector $\vec{W}$ can be identified as associated with different objects.

In some implementations, such velocity gradient-based cloud segmentation can be performed as follows. The perception system 132 and/or VAS module 133 can select a field of view 401 corresponding to a part of a sensing frame that includes multiple reflecting regions 405 giving rise to respective return points in the point cloud. The perception system 132 and/or VAS module 133 can map the radial velocity field $V_r(\vec{\rho})$ to the lateral coordinates $\vec{\rho} = (x, y, 0)$ of points within the field of view and further determine the discretized representation of the gradient of the radial velocity distribution $\vec{W}$. Because laser beams used by the sensing system have a narrow cross section, each reflected signal can be expected to be generated by a single object. The perception system 132 and/or VAS module 133 can, therefore, perform segmentation of the point cloud within the field of view into regions having the same (or similar, within the accuracy of the sensing system) magnitudes and direction of the gradient $\vec{W}$. The perception system 132 and/or VAS module 133 can then form one or more hypotheses that associate points belonging to different segmented regions with different objects. Additional sensing frames can subsequently be used for verification of the formed hypotheses.

Figure 4B:
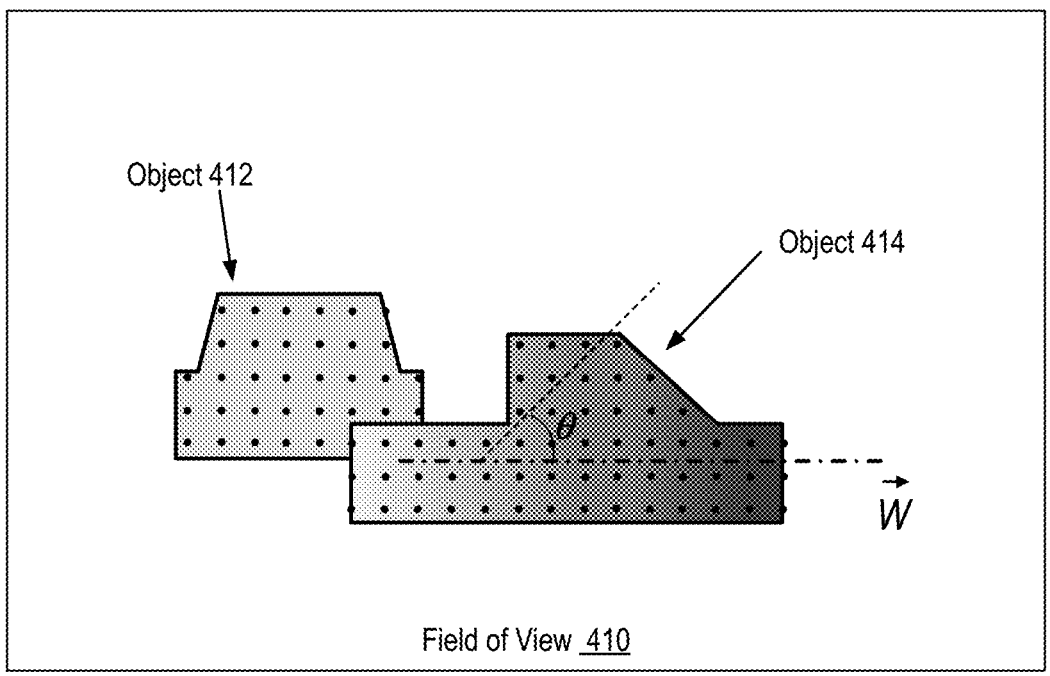
FIG. 4B illustrates how the sensing data that includes information about the radial velocity can be used in point cloud segmentation for object identification in autonomous driving applications, in accordance with some implementations of the present disclosure.
Figure 4B:
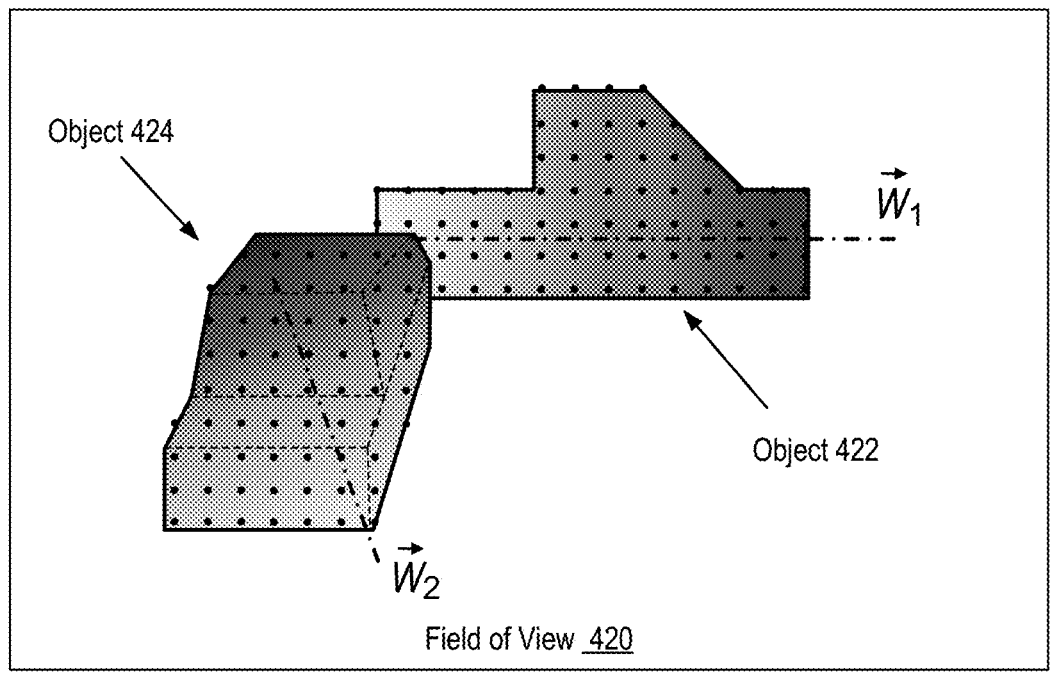

FIG. 4B illustrates how the sensing data that includes information about the radial velocity can be used in point cloud segmentation for object identification in autonomous driving applications, in accordance with some implementations of the present disclosure. A field of view 410 can correspond to a portion of a sensing frame, e.g., a first sensing frame. The return points (the point cloud) are indicated with black dots. The white region of the field of view 410 depicts a region where no reflections are detected and, therefore, no return data points are generated. A return point is indicative of a presence of an object (along the respective direction of the sensing signal) at some distance from the sensor. Conversely, an absence of a return point (at least within the range of detection) indicates that no object is present along the respective direction. Each point can have an associated range (ToF) data as well as a radial velocity (Doppler) data. The radial velocity data can be treated as a velocity field defined on the discrete set of points of the point cloud.

If objects 412 and 414 responsible for the return points were located at significantly different distances from the sensor, VAS module 133 would have little difficulty constructing a hypothesis that correctly allocates the return points to the respective objects (e.g., vehicles). However, in the instances where the objects are located close to each other (e.g., the object 412 is driving straight through an intersection e.g., away from the sensor, whereas the object 414 is making a right turn), VAS module 133 can form multiple hypotheses, including a hypothesis that all points in the field of view 410 correspond to a single object. Accordingly, it may take one or more subsequent sensing frames for VAS module to discard the initial hypothesis (e.g., after a failure of the mapping algorithm to perform a single rigid-body mapping of the point cloud in the field of view 410 to a point cloud in the next sensing frame).

The advantage of the Doppler-assisted sensing is that it provides a way to discard or confirm—using a single sensing frame—hypotheses that contain impossible or unlikely associations. The value of the radial velocity associated with specific return points is indicated in FIG. 4B by the shading of varying intensity (e.g., with darker regions indicating higher radial velocities). For example, object 412 that is moving straight away from the sensor has a uniform radial velocity field $V_r = V_{Or}$ (since $\vec{W}=0$ for an object that has no angular velocity or lateral translational velocity), which is indicated with a uniform shading. In contrast, object 412 that is making a left turn has a non-zero angular velocity (pointed up), and, therefore, the vector $\vec{n}_O \times \vec{\Omega}$ is pointed to the right. Based on the identification that the two subsets of the points in the field of view 410 are characterized by different radial velocity gradients $\vec{W}=\nabla V_r$, VAS module 133 can discard the hypothesis that field of view contains a single rigid object and segment the point cloud into two subsets of points corresponding to the object 412 and object 414. A field of view 420 is another example of how point cloud segmentation can be performed. Shown is a situation of two objects having different directions of vectors $\vec{W}_1$ and $\vec{W}_2$. As in the earlier example, based on the segmentation of the points within the field of view 420 into two clusters, VAS module 133 can form a hypothesis that field of view 420 includes two separate objects, e.g., object 422 and object 424.

The angle that vector $\vec{W}_2$ makes with the horizontal axis is exaggerated in FIG. 4B for the sake of illustration and convenience of viewing. The majority of objects in typical driving environments are rotating around axes that are parallel (or almost parallel) to the vertical axis; thus vectors $\vec{W}$ are typically pointed along a positive or a negative direction of the horizontal axis. In some instances, when the objects in the environment and/or the autonomous vehicle move on a terrain of uneven elevation (e.g., urban or rural hillside environments) and negotiate low or high points of elevation, the angular velocity $\vec{\Omega}$ can acquire horizontal components so that vectors $\vec{n}_O \times \vec{\Omega}$ can have directions that deviate from the horizontal direction. Similarly, vectors $\vec{n}_O \times \vec{\Omega}$ can depart from the horizontal axis when the direction of view $\vec{n}_O$ deviates from the horizontal plane, e.g., when moving objects are located at elevations that are different from (are above or below) the elevation of the autonomous vehicle. Additionally, in 3D environments (such as flying environments of aircraft or submarine environments of underwater naval vessels) vectors $\vec{W}$ can have a broader range of possible directions than in typical autonomous driving environments on land.

The approximations used above to express the radial velocity via the coordinates within the field of view should provide excellent accuracy for most objects in the driving environments. Specifically, an accuracy in approximating the actual distances to the points $\sqrt{R^2+\rho^2}$ with R are of the order $1-R/\sqrt{R^2+\rho^2} \approx 1-\cos\alpha \approx \alpha^2/2$, where $\tan\alpha=\rho/R$. For the field of view of angle $\alpha=10°$, the relative error is thus only 1.5%. For additional accuracy in mapping velocity field of closely located objects having larger angles of view, more precise geometric computations can be used to account for fitting the observed dependences of the radial velocity field $V_r$ on the radial distance $\rho$. It should be understood that the above description of velocity gradient-based segmentation is illustrative and that under different conditions various modifications of the procedure can be implemented. For example, there can be departures from the constant (within a given object) gradient $\vec{W}=\nabla V_r$ approximation (corresponding to a linear dependence of $V_r$ on $\vec{\rho}$) when objects are close to the sensor (e.g., located at close distances that are comparable to the size of the objects). In such instances, segmentation can still be performed based on the value of (e.g., discretized, over the available mesh of points of the point cloud) gradient vector $\vec{W}$. Specifically, points that have closer (albeit somewhat different) values of the gradient vector $\vec{W}$ are more likely to associate with the same object. Accordingly, even in the instances where various points in the point cloud have different gradient vectors, the points can be segmented into clusters based on proximity of the points to various values of the gradient vector $\vec{W}$, e.g., based on proximity to centroids (or some other reference points) of the respective clusters in the two-dimensional space of the gradient vector $\vec{W}=(W_x, W_y)$.

Since the radial velocity $V_r$ can be defined on a finite mesh of points, rather than on a continuum, the gradient vector $\vec{W}$ can be defined using finite differences. For example, if the points in the point cloud have lateral coordinates $(x_j, y_k)$, the finite difference gradient vector can be defined as $$W_x(x_j,y_k)=V_r(x_{j+1},y_k)-V_r(x_j,y_k), W_y(x_j,y_k)=V_r(x_j,y_{k+1})-V_r(x_j,y_k).$$

Alternatively, the finite difference gradient vector can be defined as $$W_x(x_j,y_k)=V_r(x_j,y_k)-V_r(x_{j-1},y_k), W_y(x_j,y_k)=(x_j,y_k)-V_r(x_j,y_{k-1}),$$

or as a linear combination (e.g., the average value) thereof. The indices j and k can enumerate consecutive points in the point cloud. If a point is missing (e.g., no reflected signal is received from the particular direction), the respective point $(x_j, y_k)$ can be omitted. The coordinates $(x_j, y_k)$ can (but do not have to) be Cartesian coordinates. In some implementations, coordinates can be any curvilinear coordinates that appropriately identify the points in the point cloud (e.g., spherical, cylindrical, elliptic, polar coordinates, etc.).

In some implementations, segmentation can be performed by adding or removing points from hypothetical point clusters. For example, VAS module 133 can identify an initial cluster populated with points having a velocity distribution that is consistent with a motion of a single rigid object. VAS module 133 can then verify whether the points outside the cluster (e.g., points that are near the current cluster boundary) fit the same distribution (e.g., are described by the same parameters $\vec{V}$, $\vec{\Omega}$, and/or $\vec{W}$). If the point fits the same distribution (e.g., within a target accuracy), the point can be included in the cluster and the cluster boundary can be shifted accordingly. In some implementations, the process can be performed in reverse, with VAS module 133 starting with one or more larger clusters and verifying whether the points inside the cluster that are located close to the current boundary fit the same distribution of velocities as the rest of the cluster. If the point does not fit the distribution with a target accuracy, the point can be pruned or omitted from the cluster (and/or probed as belonging to another cluster). In some implementations, the two schemes (adding and pruning points) can be performed concurrently. In some implementations, Doppler-assisted segmentation can further be augmented with additional information, such as reflected intensity, and so on. In some implementations, clusters can be superimposed over each other. For example, a smaller cluster corresponding to a passenger car can be surrounded by a larger cluster corresponding to a truck that is positioned behind the passenger car.

In some implementations, segmentation can be performed based on various methods of clustering, such as K-means clustering. For example, clustering can be performed by associating each data point j with a vector in a multi-dimensional feature space, such as a four-dimensional space that includes three spatial dimensions (two spatial dimensions in the instances of objects moving on a surface), $\hat{X}_j^T = (x_j, y_j, r_j, V_{rj})$, and then further associating the point with a k-th cluster of K clusters ($1 \leq k \leq K$) that are hypothesized to be present within the point cloud. A k-th cluster may have a centroid located at some point in the multidimensional space, $\hat{X}_k^T = (x_k, y_k, r_k, V_{rk})$. Both the locations of the centroids as well as the number of clusters K can be fitting parameters of the segmentation procedure that can be changed during iterative clustering (which amounts to assigning and reassigning points to clusters with increasing accuracy). A measure of how confidently j-th point belongs to k-th cluster can be a Euclidean distance parameter, such as $$D_{jk} = a(x_j - x_k)^2 + b(y_j - y_k)^2 + c(r_j - r_k)^2 + d(V_{ir} - V_{kr})^2$$

with coefficients a, b, c, d determining how much weight is assigned to a distance from the respective centroid along a particular dimension. The numerical values of the coefficients can be selected empirically, based on testing performed on actual point clouds that have been segmented by a developer or by automatic methods of segmentation, including object recognition from images taken by camera (e.g., contemporaneously, using camera that is synchronized with the sensing system). Segmentation into clusters can be performed iteratively. Each iteration can include: 1) assigning various points into clusters based on current location of the clusters' centroids (or based on other reference points or known metrics), and 2) re-computing locations of the centroids (or other reference points/metrics) based on the current assignment of points to clusters. Such iterations can be performed until the procedure converges to a target accuracy or if further iterations do not change the obtained assignment of points to current clusters.

In some implementations, techniques of adding and pruning (described above in relation to velocity gradient-based segmentation methods) can similarly be used in K-means clustering. For example, once cluster centroids are identified with sufficient accuracy based on smaller clusters, more points can be added to the identified clusters based on the distances to the identified centroids. Centroids can remain fixed or can be adjusted when new points are added. In some implementations, some points can be omitted (pruned) from clusters; points that are subject to pruning can be outlier points, points located near the current boundary of the clusters, points that preclude the iterative procedure from converging, and so on.

In the above example, K-means clustering algorithm is based on distances in a space of dimensions that represent raw data (coordinates and radial velocity). In other implementations, some of the dimensions can correspond to various processed values, such as the lateral velocity values computed based on the rigid-body equation. For example, at each iteration, for each or some of the current clusters, a best fit computation can identify translational velocity $\vec{V}$ and angular velocity $\vec{\Omega}$ (e.g., using least squares method) based on points already assigned to the cluster(s). Subsequently, based on the identified $\vec{V}$ and $\vec{\Omega}$, one or more lateral velocities can be determined for some or all points in the current cluster(s). The determined lateral components can then be used as additional dimensions in the augmented space of vectors $\hat{X}_j^T = (x_j, y_j, r_j, V_{xj}, V_{yj}, V_{rj})$, with the distances to the cluster centroids determined in the augmented space as described above, with additional distances associated with the dimensions $V_x$ and $V_x$. After reassigning points to clusters based on the computed distances, another iteration can performed, starting with identifying the updated translational velocity $\vec{V}$ and the angular velocity $\vec{\Omega}$, and so on, until the iterative procedure converges. In some implementations, other parameters can be included (e.g., as additional dimensions of the space of vectors) to further facilitate segmentations. For example, intensity of the reflected signal can be used as such an additional dimension, since different objects are likely to have at least somewhat different reflectivities (caused by different materials, paint, quality of surfaces, etc.).

In some implementations, the number of clusters K can be determined concurrently with the performance of the segmentation operation. More specifically, segmentation can be performed, alternatively, into schemes with K−1, K, K+1 . . . , etc., clusters, with various measures used to determine which segmentation scheme is to be selected, such as an elbow point method, Akaike criterion, cross-validation methods, information criteria, information theoretic jump method, silhouette methods, G-means algorithms, and so on. Although, the K-means clustering is described above, as a way of example, in some implementations, other methods of clustering augmented with velocity information, can be used instead, such as mean-shift clustering, density-based clustering, expectation-maximization clustering, hierarchical clustering, and the like.

A Gaussian Mixture Model (GMM) can be used for segmentation, in some implementations. More specifically, various points in the point cloud {P} can be distributed across (hypothesized) clusters {P$_1$}, {P$_2$}, . . . {P$_M$}. For each cluster {P$_m$}, a mean vector value E(m) of all vectors $\hat{X}$ associated with points belonging to the respective cluster can be determined together with the covariance matrix $\widehat{Cov}$ (m). For each point $\hat{X}$ that is hypothesized to belong to cluster m (or already classified as belonging to this cluster), the Mahalanobis distance can be computed from the respective distribution (cluster), e.g., $D_m(\hat{X})=[\hat{X}-[\hat{X}-\hat{E}(m)]^T \widehat{Cov}(m)[\hat{X}-\hat{E}(m)]$. Subsequently, classification of the point $\vec{X}$ can be performed based on the determined Mahalanobis distances, e.g., by associating the point $\hat{X}$ with the cluster whose Mahalanobis distance to the point $\hat{X}$ is the smallest. Similar to the K-means clustering, GMM clustering can be performed in an iterative manner, with various clusters parameters (means, covariances, etc.) and distances to various points recomputed as more points are added to different clusters or transferred between clusters (following iterative changes to the cluster parameters).

In some implementations, a large number (a dense grid) of initial hypotheses can be formulated. Each of the hypotheses can be based on a number of points (e.g., a minimal number of points) sufficient to determine hypothetical values of the angular velocity $\vec{\Omega}$ and the linear velocity $\vec{V}$ for the hypothesized cluster. For example, in a driving environment where vehicles move over a surface with a known topography (e.g., a flat surface), knowledge of vector velocities of two points (e.g., 2 planar components of the velocity of each point) can be sufficient to determine both components of the (planar) translational velocity and one (vertical) component of the angular velocity. Accordingly, in a multiple sensor setup of FIG. 5, two return points can be used to formulate an initial hypothesis. In a single-sensor setup, three or more points can be used. (In a three-dimensional environment, more points can be used to determine three components of the translational velocity and three components of the angular velocity.) In some implementations, all possible combinations of the minimal number of points can be used to formulate the initial hypotheses. In some implementations, some combinations of points can be excluded (e.g., based on large spatial separation, large difference in radial velocities, and so on) to reduce computational costs. The remaining hypotheses can be verified using the velocity data of various points in the point cloud. For example, a hypothesis being verified can be tested using additional points in the points cloud. More specifically, each additional point whose radial velocity value(s) and coordinates are consistent (e.g., within a target accuracy) with the hypothesis' angular velocity $\vec{\Omega}$ and the linear velocity $\vec{V}$ can increase a viability value for the hypothesis. (A point that is not consistent with a hypothesis can have no effect on the hypothesis' viability value.) After all hypotheses are verified using different (e.g., all) available points, the viability values can be compared to a threshold value. Hypotheses whose viability values are equal (or above) the threshold value can be maintained as viable (and/or subject to further verification using additional sensing frames). All points that are consistent with a particular maintained hypothesis can then be assigned to a respective cluster. Multiple clusters can be identified in this way, corresponding to different objects within the point cloud.

Figure 5:
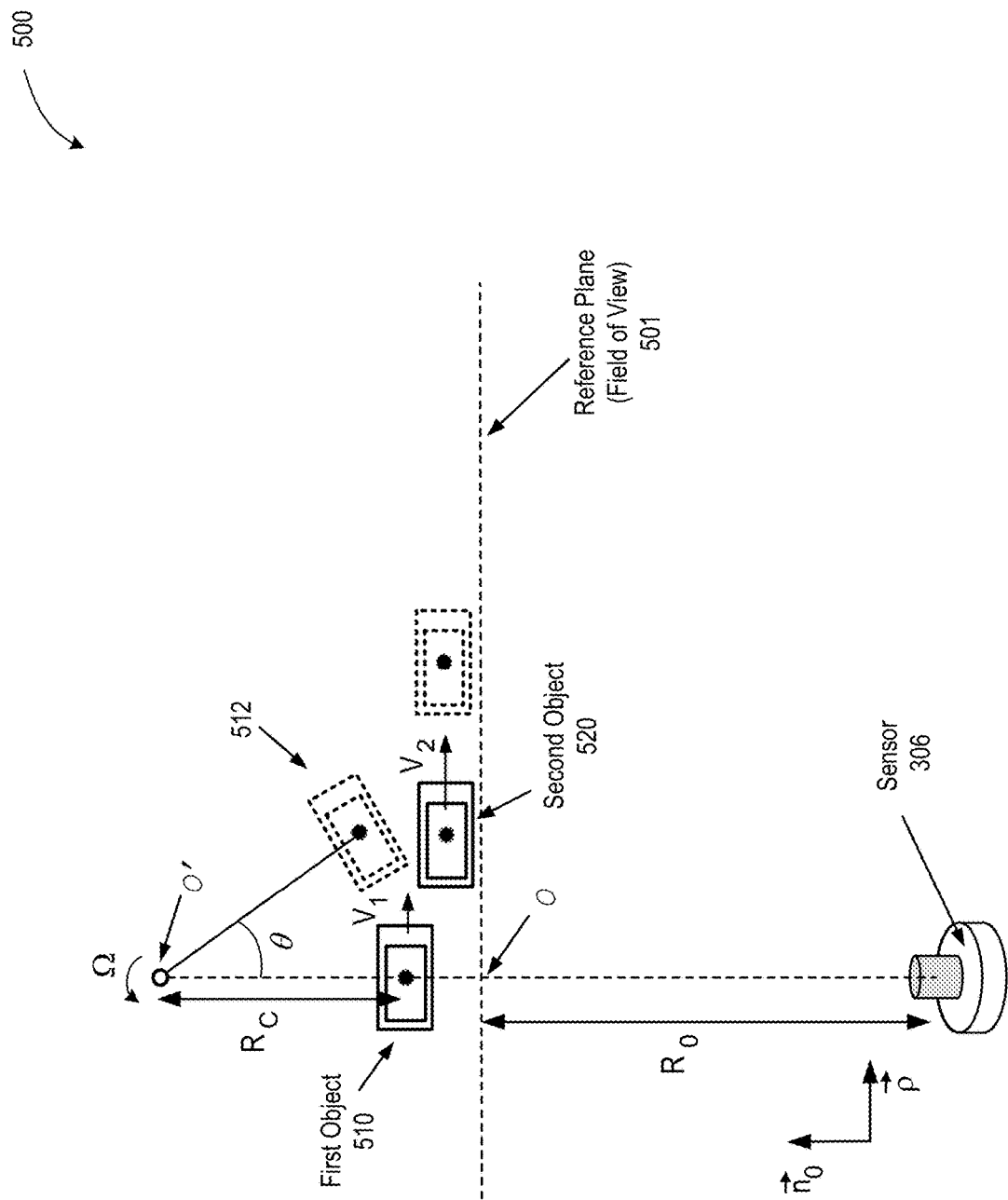
FIG. 5 is an illustration of a Doppler-assisted segmentation that uses multiple sensing frames, in accordance with some implementations of the present disclosure.

FIG. 5 is an illustration 500 of a Doppler-assisted segmentation that uses multiple sensing frames, in accordance with some implementations of the present disclosure. In some implementations, segmentation based on a single sensing frame data can be improved (augmented) with one or more additional (e.g., subsequent) sensing frames. Specifically, fitting radial velocities of points in a point cloud using a rigid-body equation can determine the radial velocity values, $$V_r = V_{Or} + \frac{\vec{V}_{O\perp} + R_O \vec{n}_O \times \vec{\Omega}}{\sqrt{R^2 + \rho^2}} \cdot \vec{\rho},$$

in a way that may not completely differentiate between the lateral translational velocity $\vec{V}_{O\perp}$ from the angular velocity components $\vec{n}_O \times \vec{\Omega}$. For example, based on a single sensing frame, a first cluster of points corresponding to a first object moving with horizontal velocity $\vec{V}_{O\perp}$ can blend with a closely located in space second cluster of points that correspond to a second object moving with a reduced (or increased) velocity $\alpha V_{O\perp}$ while additionally performing rotational motion with angular velocity $\Omega=(1-\alpha)V_{O\perp}/R_O$. In such instances, additional frames (subsequent or previous) can help with differentiating the first cluster from the second cluster and enable the perception system of AV to correctly identify both objects. Depicted schematically in FIG. 5 is a top view of two closely located objects (e.g., cars) that, based on radial velocity data of a single frame $\tau$, have similar velocity gradients $\vec{W}=(\vec{V}_{O\perp}+R_O\vec{\eta}_O \times \vec{\Omega}/R$. Coordinates of various points in the point cloud (not shown explicitly) are defined, similar to FIG. 4B, using a reference frame (field of view) 501 that is perpendicular to a reference direction $\vec{n}_O$: $\vec{R}=R\vec{n}_O+\vec{\rho}$. The reference point (which can be chosen arbitrarily), $\vec{R}_O=\vec{R}_O\vec{n}_O$, with respect to which the rigid-body equation is written, is the intersection of the reference direction $\vec{n}_O$ and reference plane 501. First object 510 is illustrated as moving with a first velocity $V_1$ around a curve with radius of curvature $R_C$ (e.g., making a left turn). Relative to a center of curvature O' (which, for the sake of simplicity is taken to be along the reference direction, $(R_C+R_O)\vec{n}_O$), first object 510 performs a purely rotational motion with angular velocity $\Omega=V_1/R_C$. Correspondingly, relative to the reference point O, first object 510 performs a combination of a rotational motion with the same angular velocity $\Omega$ and translational velocity $\vec{V}_O=R_C\vec{n}_O \times \vec{\Omega}$. As a result, the radial velocity for the cluster of points associated with first object 510 is $$V_{1r}(\tau) = \frac{(R_C + R_O)\vec{n}_O \times \vec{\Omega}}{\sqrt{R^2 + \rho^2}} \cdot \vec{\rho} = \frac{\left(1 + \frac{R_O}{R_C}\right)V_1 \rho}{\sqrt{R^2 + \rho^2}}.$$

A second object 520 is performing a translational motion with velocity $V_2$ without any rotation, so that the radial velocity for the cluster of points associated with first object 510 is $$V_{2r}(\tau) = \frac{V_2 \rho}{\sqrt{R^2 + \rho^2}}.$$

It follows that if second object 520 is traveling with velocity $V_2 \approx V_1(1+R_O/R_C)$, the clusters of points corresponding to first object 510 and second object 520 can have the same (or similar) distribution of the radial velocities.

In such situations, to perform Doppler-assisted segmentation of points belonging to first object 510 and second object 520, VAS module 133 can use a second (third, etc.) sensing frame(s) $\tau+\Delta\tau$. More specifically, whereas the distribution of radial velocities $V_{2r}$ of second object 520 can remain largely the same at $\tau+\Delta\tau$ as at time $\tau$ (except for the shift to higher $\rho$ values), the changes to the distribution of radial velocities $V_{1r}$ of first object 510 can be more substantial. Because first object 510 moves to a different location 512, translational velocity along the field of view is changed to $V_{O\perp} = V_1 \cos \theta = \cos \Omega \Delta \tau$ resulting in a modified velocity distribution:

$$V_{1r}(\tau + \Delta\tau) = \frac{\left(\cos\Omega\Delta\tau + \frac{R_O}{R_C}\right)V_1\rho}{\sqrt{R^2 + \rho^2}},$$

different from $V_{2r}(\tau+\Delta\tau) = V_{2r}(\tau)$. Accordingly, the second (third, etc.) sensing frames can be used to improve segmentation where velocity distributions for the first frame do not allow to unambiguously determine allocation of return points to various clusters. The second frame $\tau+\Delta\tau$ can be obtained by a sensor 306 mounted on the AV 302. The sensor 306, which obtains the second frame, can be the same sensor as the sensor that obtains the first frame, e.g., lidar sensor(s) 122. In some implementations, increased segmentation can be further augmented with detecting an increasing spatial separation (e.g., radial and/or angular, or both) of multiple objects in the second frame (which can be inconsistent with a single fixed-sized object).

The functionality provided by additional sensing frames can be used for hypotheses formation and hypotheses verification. In one implementation, a set (cluster) of return points {P} belonging to a first frame and compactly located in some region of space can be hypothesized to associate with a single object. By performing fitting of the radial velocity distribution to the rigid-body equation, VAS module 133 can evaluate the soundness of the hypothesis. For example, VAS module 133 can attempt fitting all points with a single velocity $\vec{V}$ and a single angular velocity $\vec{\Omega}$, e.g., using the least squares error method (or any other fitting procedure). Radial velocity components $V_r(j)$ computed with the determined values $\vec{V}$ and $\vec{\Omega}$ can then be compared to the corresponding actual measured components, and the differences can be used for verification of the hypothesis. For example, if the computed errors (e.g., an average error or a maximum error) exceed a threshold difference, which can be chosen equal or similar (e.g., of the same order of magnitude) to the lidar accuracy, the hypothesis that all points of the cluster points {P} correspond to the same object can be invalidated. If the errors are below the threshold difference, the hypothesis can be considered as still viable, e.g., can be assumed to be the current working hypothesis, which can then be further tested using subsequent sensing frames.

Alternatively, VAS module 133 can verify the single-object hypothesis by checking the stability of the hypothesis. In one exemplary implementation, VAS module 133 can select a low number of points (e.g., three) and determine the respective parameters $\vec{V}$ and $\vec{\Omega}$. VAS module 133 can then re-compute parameters $\vec{V}$ and $\vec{\Omega}$ after more points are added to the initial selection of points, up to the total number of the points in the cluster. If parameters $\vec{V}$ and $\vec{\Omega}$ change within the pre-determined ranges corresponding to the acceptable accuracy, the hypothesis can be considered viable (and, optionally, subject to additional verification). If, on the other hand, parameters $\vec{V}$ and $\vec{\Omega}$ change outside the pre-determined ranges, the hypothesis can be invalidated. The perception system 132 can, subsequently, form a hypothesis that the set of points {P} actually consist of subsets {$P_1$}, {$P_2$}, {$P_3$} . . . corresponding to two or more different objects. The two or more different objects can be independent objects, such as two separate vehicles, or part of the same object performing (partially) independent motion, such as a body of a car and a wheel of the same car. The pre-determined ranges can be the same for all variables, in some implementations, whereas in other implementations, the pre-determined ranges can be different. For example, a larger $V_\perp$ error can be tolerated compared with the errors in $V_r$, in one example. Multiple other schemes can be devised to determine if the error in determination of the variables matches the precision of the sensing system with the outcome of invalidating those hypotheses that have errors in excess of the errors of accuracy of the sensing system in determining (fitting) various input values, such as the radial velocity, distance, angular distance, and the like.

If the initial single-cluster hypothesis is invalidated, VAS module 133 can attempt to segment the cluster of points {P} into sets {$P_1$}, {$P_2$}, {$P_3$} . . . representing multiple objects and fitting each set with a separate pair of velocities, e.g., ($\vec{V}_1, \vec{\Omega}_1$), ($\vec{V}_2, \vec{\Omega}_2$), ($\vec{V}_3, \vec{\Omega}_3$) . . . etc. Various schemes can be used to select initial sets, such as selecting sets of points that are closely spaced, or sets of points that have similar radial distances, or sets of points that have a similar radial velocity, or sets of points that have a similar reflected signal intensity, or any other procedure. After the initial selection is made, additional points can be added to various sets, moved between the sets, removed from the sets, and so on, until such a distribution of points among the sets is achieved in which the errors are within some pre-determined acceptable limits. Segmentation can be performed in such a way that a single point can belong to only one of the sets. Some points can be excluded from all sets (e.g., as outliers or spurious reflections), so that the number of points in all sets {$P_1$}, {$P_2$}, {$P_3$} . . . can be smaller than the number of points in the cluster {P}.

The velocity data can also be used for additional verification of previously formed and tested hypotheses. For example, a hypothesis that was formed based on a single sensing frame can be tested (evaluated) when the second sensing frame data is obtained. For example, the velocity and coordinates of the points in the second frame can be fit using the same pairs ($\vec{V}_k, \vec{\Omega}_k$) or multiple pairs having close values (as the velocities can change with time) for frames closely-spaced in time.

Figure 6:
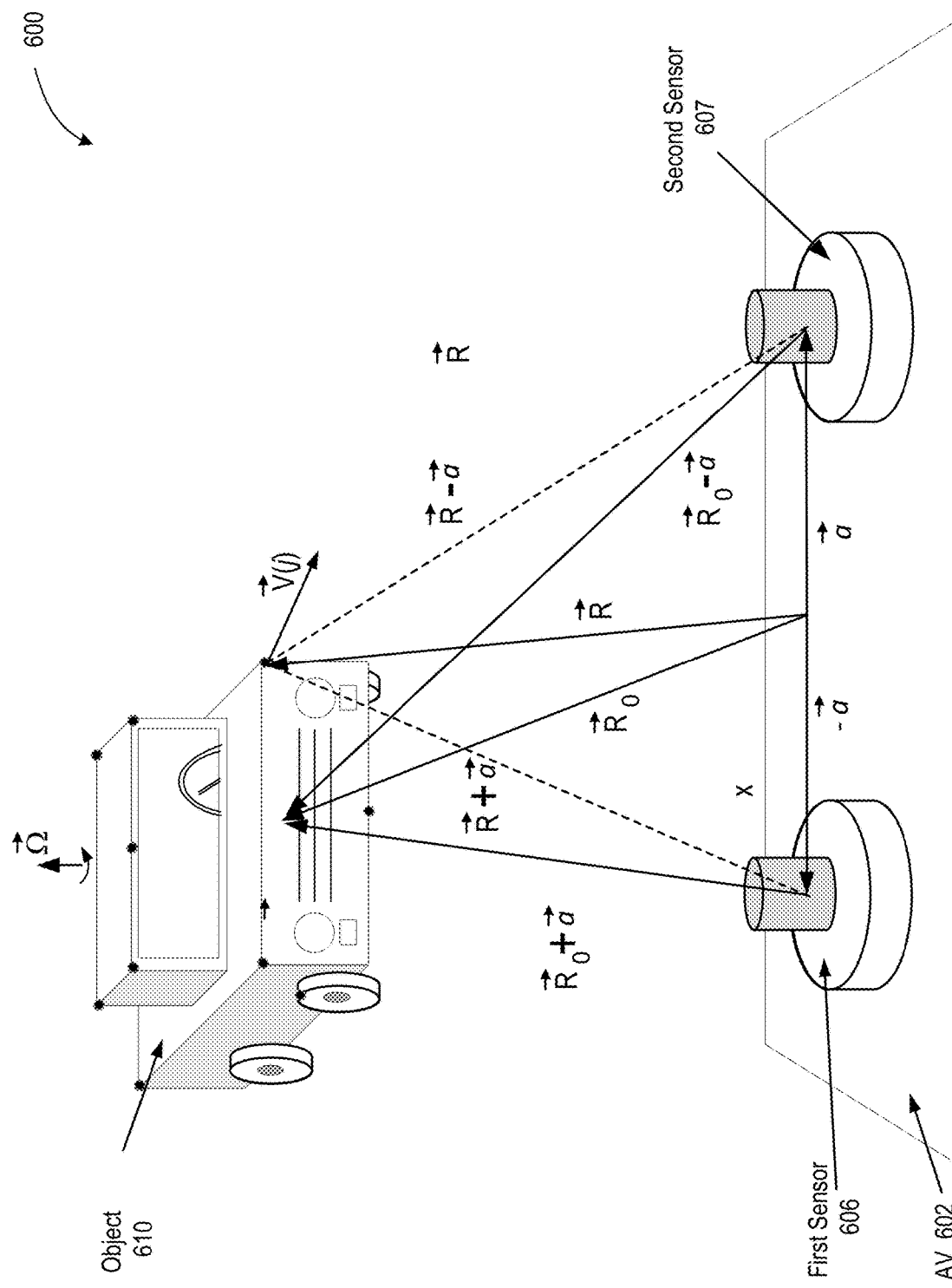
FIG. 6 is an illustration of a double sensor setup for segmentation of point clouds in autonomous driving applications, in accordance with some implementations of the present disclosure.

In some implementations, the sensing system 120 can include more than one sensor, e.g., more than one coherent lidar, such as some lidar sensor(s) 122. In such implementations, multiple sensing frames can be obtained simultaneously (provided that frames of different sensors are synchronized). This can allow the perception system 132 to perform segmentation faster and more accurately than in case of a single-sensor system, even before subsequent sensing frames are obtained. FIG. 6 is an illustration of a double sensor setup 600 for segmentation of point clouds in autonomous driving applications, in accordance with some implementations of the present disclosure. Depicted in FIG. 6 is AV 602 that has multiple coherent lidar sensors (two are shown for specificity), such as a first sensor 606 and a second sensor 607, which can be any type of a coherent (or a combination of a coherent and incoherent) lidar devices capable of sensing the distance to a reflecting surface and the radial velocity of the reflecting surface of an object in the driving environment. The sensors 606 and 607 can performs scanning of the driving environment and generate return points corresponding to various objects. Each sensor can output signals that have imparted phase signatures (e.g., chirps or any other phase or frequency modulation features) that are unique to the sensor, so that the return signals from different sensors do not interfere with each other. Sensors 606 and 607 can be located at some distance 2a (the baseline distance) from each other for improved lateral velocity resolution. In some implementations, the baseline distance can be made as large as practical (e.g., as limited by the length or width of AV 602). In some implementations, because lateral velocity resolution has a maximum in the direction perpendicular to the baseline and a minimum in the direction parallel to the baseline, more than two sensors can be utilized, e.g., placed in a non-collinear (e.g., triangular) arrangement. For example, a third sensor can be located near the front or back of the AV 603.

In some implementations, a processing logic of the sensing system (e.g., sensing system 120) can synchronize the sensing frames of sensor 606 and sensor 607 so that the sensing signals are output at the same instances of time, e.g., at $\tau$, $\tau+\Delta\tau$, $t+2\Delta\tau$, $\tau+3\Delta\tau$, etc. In other implementations, the sensor frames can be staggered (for example, to reduce possible interference or to improve temporal resolution) so that one sensor outputs signals at times $\tau$, $\tau+\Delta\tau$, $\tau+2\Delta\tau$, $\tau+3\Delta\tau$, whereas the other sensor outputs sensing signals at times $\tau+\Delta\tau/2$, $\tau+3\Delta\tau/2$, $\tau+5\Delta\tau/2$, and so on. Each sensor can obtain its respective return points which can be—due to different positioning and timing of the sensing frames—somewhat different from the return points of the other sensor(s) even at the same times. A processing logic of the perception system (e.g., perception system 132) can identify, for each return point $\vec{R}_1$ of the first sensor, the closest return point $\vec{R}_2$ of the second sensor and associate the two points with the same reflecting part of the object 610. In some implementations, the processing logic can approximate that the reflecting part is located at the halfway point, $(\vec{R}_1+\vec{R}_2)/2$.

The motion of the (rigid body) object 610 can be described by the rigid body equation, which can now be projected separately onto the direction of view of the first sensor 606, $\vec{R}+\vec{a}$, and the direction of view of the second sensor 607, $\vec{R}-\vec{a}$. The two respective radial velocities (with the + sign corresponding to the direction from the first sensor and the − sign corresponding to the direction from the second sensor) are, $$V_{r\pm} = \vec{V}_O \cdot \frac{\vec{R}_\pm}{R_\pm} + (\vec{R}_{O\pm} \times \vec{\Omega}) \cdot \frac{\vec{R}_\pm}{R_\pm},$$

where $\vec{R}_\pm = \vec{R} \pm \vec{a}$, $R_\pm = |\vec{R} \pm \vec{a}|$, and $\vec{R}_{O\pm} = \vec{R}_O \pm \vec{a}$. Because for each point there are two radial velocity equations, three points can potentially determine all six components of the translational and the angular velocities of the object 610. Since the two radial directions are different from each other, lateral velocity of the rigid object can be determined based on a single reference frame, in some implementations. If multiple points are available per moving rigid object, methods of statistical analysis can be used for improving accuracy of segmentation, as described above. In some implementations, based on the determined (e.g., by fitting to the rigid-body equations) lateral velocities of various objects, the perception system 132 can separate the objects that have similar radial velocities but distinct lateral velocities (e.g., vehicles passing each other in opposite directions). In some instances, accuracy of the lateral velocity determination can be range-specific, higher at lower distances to the objects and lower at longer ranges. For example, if the radial velocity is known with precision $\delta V_r$ (meaning that a measured value $V_r$ indicates that the actual velocity is within the $[V_r-\delta V_r, V_r+\delta V_r]$ interval), the lateral velocity $V_\perp$ can be determined with accuracy $$\delta V_\perp = \frac{2a}{r} \delta V_r.$$

For example, if $\delta V_r=0.1$ m/s, the lidar sensors 406 and 407 are located at distance $2a=1.2$ m, the accuracy of the lateral velocity determination at distance R=60 m would be $\delta V_{\perp x}=5.0$ m/s. Such precision can be quite satisfactory to distinguish (based on a single sensing frame) vehicles that move in opposite directions or to distinguish a car and a bicycle (or a pedestrian) regardless of the direction of their motion.

Figure 7:
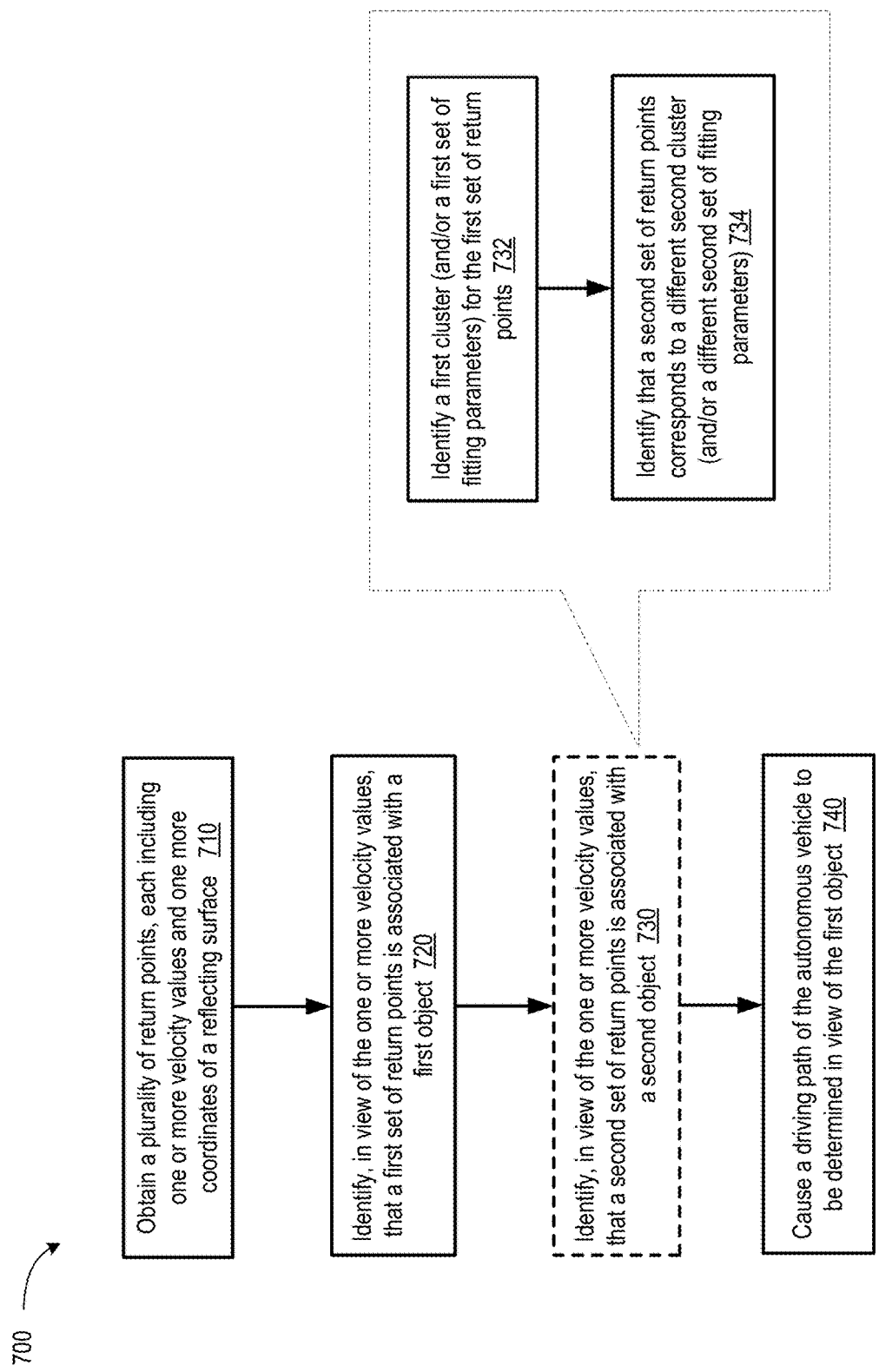
FIG. 7 depicts a flow diagram of an example method of using Doppler-assisted segmentation of a point cloud for autonomous driving vehicle applications, in accordance with some implementations of the present disclosure.

FIG. 7 depicts a flow diagram of an example method 700 of using Doppler-assisted segmentation of a point cloud for autonomous driving vehicle applications, in accordance with some implementations of the present disclosure. Method 700, as well as methods 800 and 900 described below, and/or each of their individual functions, routines, subroutines, or operations can be performed by a processing device, having one or more processing units (CPU) and memory devices communicatively coupled to the CPU(s). The processing device executing methods 700, 800, and 900 can perform instructions from various components of the perception system 132, e.g., the VAS module 133. In certain implementations, methods 700, 800, and 900 can be performed by a single processing thread. Alternatively, methods 700, 800, and 900 can be performed by two or more processing threads, each thread executing one or more individual functions, routines, subroutines, or operations of the method. In an illustrative example, the processing threads implementing methods 700, 800, and 900 can be synchronized (e.g., using semaphores, critical sections, and/or other thread synchronization mechanisms). Alternatively, the processing threads implementing methods 700, 800, and 900 can be executed asynchronously with respect to each other. Various operations of methods 700, 800, and 900 can be performed in a different order compared with the order shown in FIGS. 7, 8, and 9. Some operations of the methods can be performed concurrently with other operations. Some operations can be optional.

Method 700 can be directed to systems and components of an autonomous driving vehicle, such as the autonomous vehicle 100 of FIG. 1A. Method 700 can be used to improve performance of the autonomous vehicle data processing system 130 and/or the autonomous vehicle control system 140. At block 710, method 700 can include obtaining, by a sensing system of an autonomous vehicle (AV), a plurality of return points, each return point comprising one or more velocity values and two or more coordinates of a reflecting region that reflects a signal emitted by the sensing system. Obtaining return points can include some or all of the following. One or more sensors (e.g., lidar, FMCW, hybrid ToF/coherent lidar, and so on) of the sensing system of the AV can emit a series of signals (e.g., optical signals). The signals can be emitted in a periodic (cyclic) pattern, e.g. by rotating, pivoting or otherwise scanning transmitters or transmitted beams (e.g., through beam steering, etc.), in various directions, e.g., forming the 360-degree panoramic pattern. The signals can strike various objects (moving or stationary) and reflect back towards the sensor from various reflecting regions of the objects. The number of reflecting regions can vary depending on the nature, size of the object, the object's level of occlusion by other objects. The intensity of the reflected signals can depend on the kind (material, surface type, etc.) of the reflecting region, the wavelength of the signal, polarization, etc. Based on the characteristics and timing of the reflected signals, the sensing system of the AV can generate a plurality of return points. The return points are data entries that are associated with a reflection of one of the emitted signals from an object of the environment. The return points can be generated in real time. Each return point can include various data entries, such as a timestamp of a cycle of the sensor, intensity of the returned signals, polarization of the returned signals. Each return point can include two or more coordinates of the respective reflecting region. For example, the coordinates can be a distance to the reflecting region (e.g., determined from the time of flight of the returned signals), and one or more directional angles, such as the azimuthal angle specifying direction within the horizontal plane and the polar angle specifying the elevation above (or below) the horizontal plane. Each return point can further include a velocity value; the velocity value can represent the radial component of the velocity of the reflecting region with respect to the radial direction from a transmitter of the sensing system towards the reflecting region.

The sensor can be a coherent light detection and ranging device (lidar) capable of detecting the radial velocity using, e.g., Doppler-assisted sensing. In some implementations, the coherent lidar can be a frequency-modulated continuous-wave lidar and the signals emitted by the sensor can include phase-modulated or frequency-modulated electromagnetic waves. The sensor can also be capable of concurrently emitting various other signals, such as pulsed signals, which can be used for ToF distance measurements. In some embodiments, the sensor can include separate ToF lidar and a coherent lidar, each emitting separate signals that can be synchronized, mixed, and transmitted along the same optical paths.

The return points can belong to (e.g., be associated with) various sensing frames corresponding to different cycles (e.g., revolutions) of the transmitter(s) of the sensing system. For example, a first sensing frame can correspond to a first cycle, a second sensing frame can correspond to a different (e.g., earlier or later) cycle. The terms "first" and "second" should be understood as identifiers only and should not presuppose a specific order. In particular, there can be an arbitrary number of intervening frames between the first frame and the second frame.

At block 720, method 700 can continue with a processing device (e.g., a device executing software instructions issued by VAS module 133 as part of the perception system 132) identifying, in view of the one or more velocity values of each of a first set of the return points of the plurality of return points, that the first set of the return points is associated with a first object in an environment of the AV. In some implementations, the first set of points can be identified (e.g., by the perception system) by identifying the first set of the return points as a first cluster in a multi-dimensional feature space whose dimensions comprise the obtained one or more velocity values and the one or more coordinates. More specifically, identifying the first set of the return points as the cluster in the multi-dimensional feature space can include applying a clustering criterion to the return points of the first set. In one example, the clustering criterion can include (at least in part) computing distances from the return points of the first set to reference points (e.g., centroids in one implementation) of multiple clusters and determining that the distance from each of the first set of the return points to a reference point of the first cluster is smaller than the distances to reference points of other clusters. The first set of points can be identified as part of a hypothesis that the points in the first set correspond to a single object. In some implementations, identifying that the first set of the return points is associated with the first object comprises fitting the one or more velocity values and the one or more coordinates of each of the first set of the return points to a rigid-body equation characterizing a motion of a rigid body. A rigid body can be a body in which a distance between any two points is fixed. As a result, the motion of such a body can be described with six parameters (or fewer than six parameters, in cases of a geometrically restricted motion, such as a two-dimensional motion). The six parameters can be (1) the three components of the object's translational velocity $\vec{V}$, and (2) the three components of the object's rotational (angular) velocity $\vec{\Omega}$. In some implementations, additional parameters can include coordinates of a center of rotation with respect to which the translational velocity is specified.

Fitting the one or more velocity values (e.g., a first radial velocity measured by a first sensor and/or a second radial velocity measured by a second sensor) and the one or more coordinates of each return point of the first set can include predicting the radial velocity value(s) based on the coordinates of the return points and the fitting parameters (e.g., $\vec{V}$ and $\vec{\Omega}$) using the rigid body equation and comparing to the measured radial velocity values (e.g., $V_r$ if one sensor is being used, or $V_{r+}$ and/or $V_{r-}$, if two sensors are being used, and so on). A fitting error can then be determined for the first cluster. For example, the fitting error can be a mean squared error, a median squared error, a maximum squared error, or any other function (e.g., a statistical measure) characterizing the error between the predicted velocities and the measured velocities. If the computed fitting error is greater than a target error, the hypothesis can be invalidated. If the computed fitting error is smaller than the target error, the hypothesis can be accepted (in some implementations, subject to further verification, e.g., using additional sensing frames).

In some implementations, method 700 can continue, at optional block 730, with the processing device identifying, in view of the one or more velocity values of a second set of the return points of the plurality of return points, that the second set of the return points is associated with a second object in the environment of the AV. In some implementations, the second subset of the return points is different from the first subset of the return points, e.g., the first subset and the second subset are non-overlapping. For example, a first subset can include points corresponding to reflections from a car whereas a second subset of points can include points corresponding to reflections from a bus. The first subset and the second subset can correspond to objects located close to each other (e.g., the car and the bus standing next to each other at a street light in the adjacent lanes). Alternatively, the first subset and the second subset can correspond to objects located far apart (e.g., the car ahead of the AV and the bus behind the AV). Alternatively, the first subset and the second subset can correspond to parts of the same object.

In some implementations, as shown by the blowout section in FIG. 7, identifying that the second set of the return points is associated with the second object can include identifying the first set of the return points as a first cluster in the multi-dimensional feature space (block 732) and further identifying the second set of the return points as a second cluster in the multi-dimensional feature space, the second cluster centered differently from the first cluster (e.g., having a different centroid than the second cluster) (block 734). In some implementations, identifying that the second set of the return points is associated with the second object can include identifying a first set of fitting parameters for fitting the one or more velocity values and the one or more coordinates of each point of the first set of the return points to a rigid-body equation (block 734), identifying a second set of fitting parameters for fitting the one or more velocity values and the one or more coordinates of each point of the first set of the return points to the rigid-body equation; and determining that the second set of fitting parameters is different from the first set of fitting parameters (block 734).

At block 740, method 700 can continue with the processing device causing a driving path of the AV to be determined in view of the motion of the first physical object (and, optionally, the second physical object). For example, the perception system could have identified the first set as an object moving with the speed of 30 mph while making a right-hand turn with the radius of 60 m and communicated this information to the control system (e.g., the AVCS 240). The control system can then determine that the AV is about to enter the same intersection before the object can complete the turn. The control system can determine a new path for the AV, which can include braking, changing lanes, stopping, backing up and so on. The control system can subsequently output instructions to powertrain and steering 150, vehicle electronics 160, signaling 170, etc., to ensure that the AV follows the determined driving path.

Figure 8:
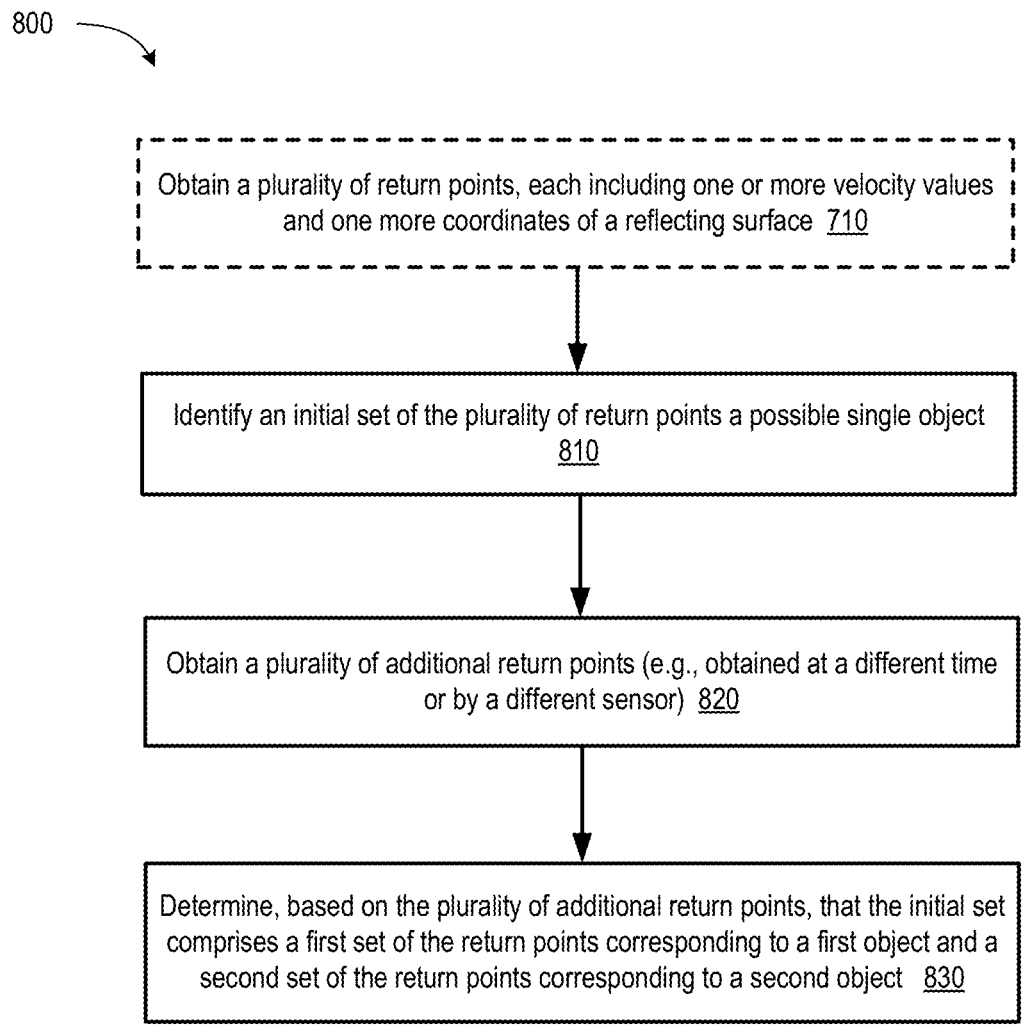
FIG. 8 depicts a flow diagram of an example method of augmenting segmentation of a point cloud with data from one or more additional sensing frames for object identification and tracking in autonomous driving vehicle applications, in accordance with some implementations of the present disclosure.

FIG. 8 depicts a flow diagram of an example method 800 of augmenting segmentation of a point cloud with data from one or more additional sensing frames for object identification and tracking in autonomous driving vehicle applications, in accordance with some implementations of the present disclosure. Method 800 can be performed in conjunction with block 710 of method 700 of identifying the association of the first subset of the return points with the motion of the first object. At block 810, the processing device performing method 800 can identify an initial set of the plurality of return points as a possible (e.g., hypothesized) single object. The identification of the initial set can be performed using clustering in a multi-dimensional space, or fitting to a rigid-body equation, or any combination thereof, or any other methods. The identification of the initial set can be performed using sensing data from a first sensing frame (e.g., corresponding to one cycle of a transmitter of the sensing system). In some implementations, the initial set can be determined (e.g., within target accuracy) to belong to a single object, whereas the initial set has points that, in fact, belong to two (or more) separate objects whose radial velocity distributions are close to each other, based on a single sensing frame.

At block 820, the processing device performing method 800 can obtain a plurality of additional return points. The plurality of additional return points can be obtained by the sensing system similarly to how the original plurality of points was obtained at block 710. In some implementations, the plurality of additional return points belongs to a second sensing frame corresponding to a different cycle of the same transmitter of the sensing system, e.g., transmitter 308 of sensor 306, as shown in FIG. 3. In some implementations, the plurality of additional return points are obtained using a second sensor of the sensing system (e.g., second sensor 607 of FIG. 6), the second sensor located differently than the first sensor (e.g., first sensor 606 of FIG. 6). Each additional return point can include an additional one or more velocity values and one or more additional coordinates of a respective reflecting region.

At block 830, method 800 can continue with the processing device determining, based on the obtained plurality of additional return points, that the initial set comprises the first set of the return points corresponding to the first object and the second set of the return corresponding to the second object. For example, as disclosed above in relation to FIG. 5, the additional return points can indicate positions and velocities of various reflecting regions of the first object as detected by the first sensor at different times. In another example, as disclosed above in relation to FIG. 6, the second set can indicate positions and velocities of various reflecting regions of the first object as detected by the second sensor. The additional return points, corresponding to the locations and velocities of the first object and the second object at a later (or earlier) instance of time, can be indicative of a greater separation of the velocity distributions (and/or their spatial separation) of the two objects and can be used for segmentation the initial set of points into two separate clusters (e.g., according to the clustering criteria being used) corresponding to the two or more objects.

Figure 9:
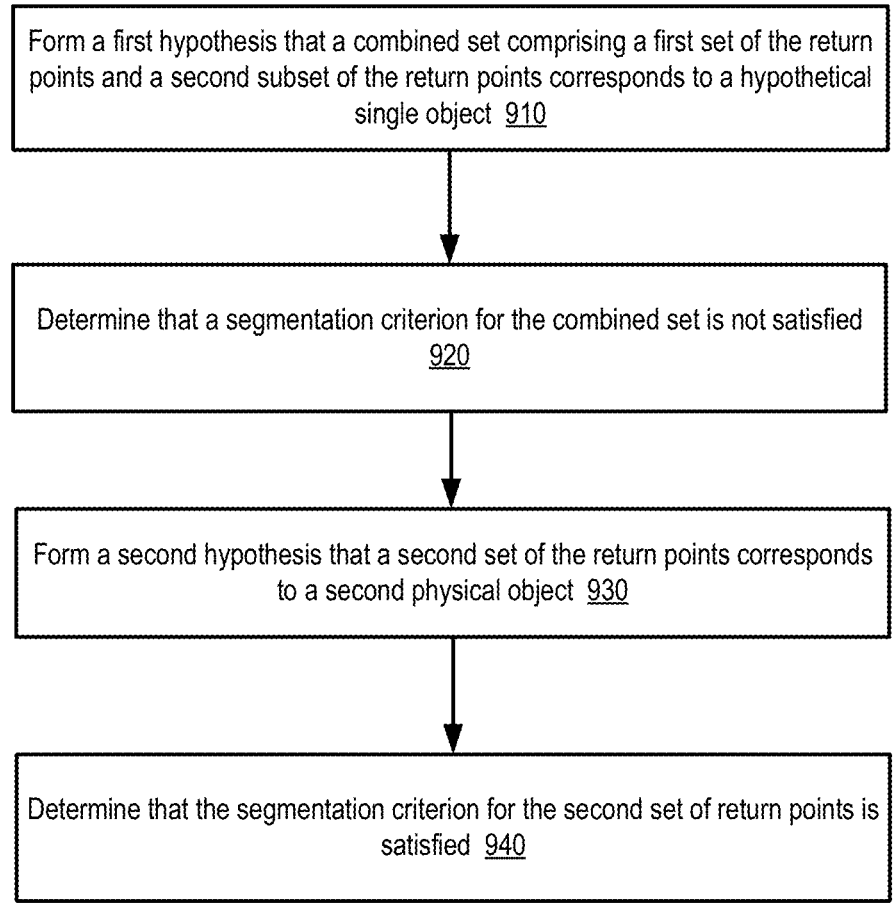
FIG. 9 depicts a flow diagram of an example method of segmentation of return points into associations with multiple objects for object identification and tracking for autonomous driving vehicle applications, in accordance with some implementations of the present disclosure.

FIG. 9 depicts a flow diagram of an example method 900 of segmentation of return points into associations with multiple objects for object identification and tracking for autonomous driving vehicle applications, in accordance with some implementations of the present disclosure. Method 900 can be performed in association with method 700. At block 910, the processing device performing method 900 can form, based on the obtained plurality of return points, a first hypothesis. The plurality of return points can include a combined set of points {P} which can further include sets {P₁}, {P₂}, . . . etc. The first hypothesis can associate the set of points {P} with a hypothetical single object.

The processing device performing method 900 can perform verification of the first hypothesis. In some implementations, the processing device can determine if a segmentation criterion is satisfied. For example, the segmentation criterion can be a clustering criterion, which can be based on distances to reference points of different clusters in the multi-dimensional feature space. In some implementations, determining if the segmentation criterion is satisfied can involve fitting of the velocity values of the return points of the combined set {P} using a single combination of the translational velocity $\vec{V}$ and the angular velocity $\vec{\Omega}$ and computing a fitting error. The fitting error can be evaluated using various a loss function, e.g., using a weighted sum of squared errors between the predicted velocities and the actual measured velocities, or some other loss function.

At block 920, method 900 can continue with the processing device determining that the segmentation criterion for the combined set is not satisfied (e.g., the target accuracy of fitting is not achieved). At block 930, method 900 can continue with the processing device forming a second hypothesis that the second set of the return points $\{P_2\}, \ldots$ corresponds to a separate (e.g., second) physical object. Optionally, the second hypothesis can further assume that the first set of points $\{P_1\}$ corresponds to some other physical object. Based on the second hypothesis, the processing device can perform fitting the velocity values of the return points of the set $\{P_2\}$ with a second combination of the translational velocity $\vec{V}_2$ and the angular velocity $\vec{\Omega}_2$. The processing device can perform fitting the velocity values of the return points of the set $\{P_1\}$ with a different combination of translational velocity $\vec{V}_1$ and angular velocity $\vec{\Omega}_1$. In some implementations, the processing device can perform clustering in the multi-dimensional space based on the second hypothesis. At block 940, method 900 can continue with determining that the segmentation criterion for the second object is satisfied, thus confirming the viability of the second hypothesis.

Figure 10:
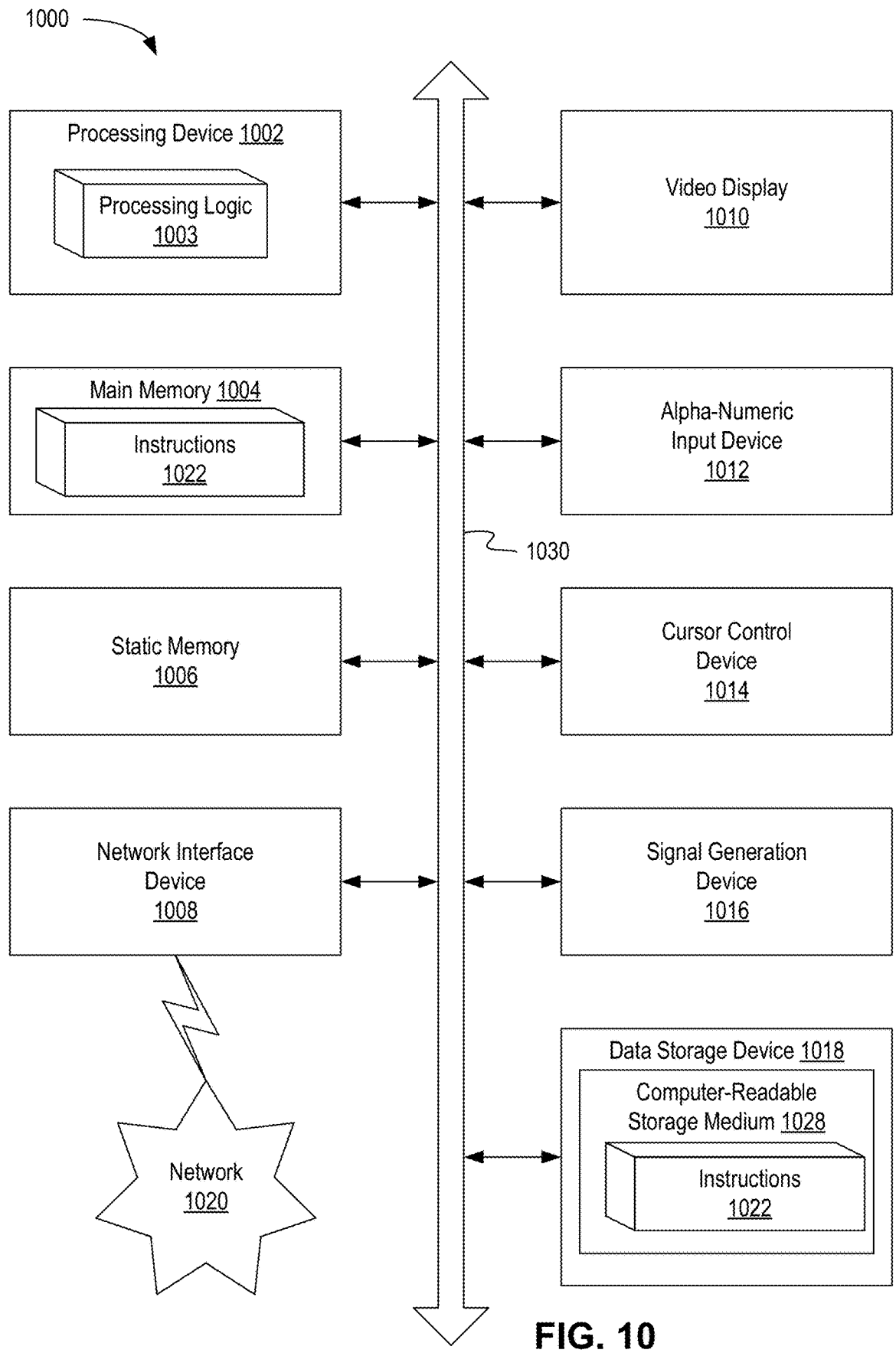
FIG. 10 depicts a block diagram of an example computer device capable of enabling Doppler-assisted segmentation of a point cloud for autonomous driving vehicle applications, in accordance with some implementations of the present disclosure.

FIG. 10 depicts a block diagram of an example computer device 1000 capable of enabling Doppler-assisted segmentation of a point cloud for autonomous driving vehicle applications, in accordance with some implementations of the present disclosure. Example computer device 1000 can be connected to other computer devices in a LAN, an intranet, an extranet, and/or the Internet. Computer device 1000 can operate in the capacity of a server in a client-server network environment. Computer device 1000 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1000 can include a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which can communicate with each other via a bus 1030.

Processing device 1002 (which can include processing logic 1003) represents one or more general-purpose processing devices such as a microprocessor, central processing unit, or the like. More particularly, processing device 1002 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 can be configured to execute instructions performing method 700 of method of using Doppler-assisted segmentation of a point cloud, method 800 of augmenting segmentation of a point cloud with data from one or more additional sensing frames, and method 900 of segmentation of return points into associations with multiple objects.

Example computer device 1000 can further comprise a network interface device 1008, which can be communicatively coupled to a network 1020. Example computer device 1000 can further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 can include a computer-readable storage medium (or, more specifically, a non-transitory computer-readable storage medium) 1028 on which is stored one or more sets of executable instructions 1022. In accordance with one or more aspects of the present disclosure, executable instructions 1022 can comprise executable instructions performing method 700 of using Doppler-assisted velocity reconstruction and object tracking, method 800 of augmenting segmentation of a point cloud with data from one or more additional sensing frames, and method 900 of segmentation of return points into associations with multiple objects during velocity reconstruction and object tracking.

Executable instructions 1022 can also reside, completely or at least partially, within main memory 1004 and/or within processing device 1002 during execution thereof by example computer device 1000, main memory 1004 and processing device 1002 also constituting computer-readable storage media. Executable instructions 1022 can further be transmitted or received over a network via network interface device 1008.

While the computer-readable storage medium 1028 is shown in FIG. 10 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    obtaining, by a sensing system of an autonomous vehicle (AV), a plurality of return points, each return point comprising one or more velocity values and one or more coordinates of a reflecting region that reflects a signal emitted by the sensing system, the one or more velocity values and the one or more coordinates obtained for a same first sensing frame;
    identifying, in view of a distance in a coordinate-velocity space from each of a first set of the return points of the plurality of return points to at least one reference point in the coordinate-velocity space, that the first set of the return points is associated with a first object in an environment of the AV; and
    causing a driving path of the AV to be determined in view of the first object.

2. The method of claim 1, wherein the sensing system of the AV comprises a coherent light detection and ranging device (lidar) and wherein the signal emitted by the sensing system comprises a phase-modulated or a frequency-modulated electromagnetic wave.

3. The method of claim 2, wherein the coherent lidar is a frequency-modulated continuous-wave lidar.

4. The method of claim 1, wherein the one or more velocity values represent a component of a velocity of the reflecting region along a direction from a transmitter of the sensing system to the reflecting region.

5. The method of claim 1, wherein the one or more velocity values comprise a first velocity value obtained using a first sensor of the sensing system and a second velocity value obtained using a second sensor of the sensing system, wherein the second sensor is located differently from the first sensor.

6. The method of claim 1, wherein the plurality of return points belong to a sensing frame corresponding to one cycle of a transmitter of the sensing system.

7. The method of claim 1, wherein identifying that the first set of the return points is associated with the first object comprises identifying the first set of the return points as a first cluster in the coordinate-velocity space, wherein identifying the first set of the return points as the cluster in the coordinate-velocity space comprises using a clustering criterion.

8. The method of claim 7, wherein the clustering criterion is based, at least in part, on distances in the coordinate-velocity space from each of the first set of return points to the reference point in the coordinate-velocity space, the reference point being associated with a centroid of the first cluster.

9. The method of claim 1, wherein identifying that the first set of the return points is associated with the first object comprises fitting the one or more velocity values and the one or more coordinates of each of the first set of the return points to a rigid-body equation characterizing a motion of a rigid body, wherein the rigid body is a body in which a distance between any points is fixed.

10. The method of claim 1, further comprising:
    identifying, in view of the one or more velocity values of a second set of the return points of the plurality of return points, that the second set of the return points is associated with a second object in the environment of the AV, wherein the second object is different from the first object.

11. The method of claim 10, wherein identifying that the second set of the return points is associated with the second object comprises:
    identifying the first set of the return points as a first cluster in the coordinate-velocity space; and
    identifying the second set of the return points as a second cluster in the coordinate-velocity space, the second cluster centered differently from the first cluster.

12. The method of claim 10, wherein identifying that the second set of the return points is associated with the second object comprises:
    identifying a first set of fitting parameters for fitting the one or more velocity values and the one or more coordinates of each of the first set of the return points to a rigid-body equation;
    identifying a second set of fitting parameters for fitting the one or more velocity values and the one or more coordinates of each of the first set of the return points to the rigid-body equation; and determining that the second set of fitting parameters is different from the first set of fitting parameters.

13. The method of claim 10, wherein identifying that the second set of the return points is associated with the second object comprises:

forming a first hypothesis that a combined set comprising the first set of the return points and the second set of the return points corresponds to a single object, determining that a segmentation criterion for the combined set is not satisfied;

forming a second hypothesis that the second set of the return points corresponds to the second object; and determining that the segmentation criterion for the second set of the return points is satisfied.

14. The method of claim 10, wherein identifying that the first set of the return points is associated with the first object and that the second set of the return points is associated with the second object comprises:

identifying an initial set of the plurality of return points as a possible single object;

obtaining, by the sensing system, a plurality of additional return points, each additional return point comprising additional one or more velocity values and additional one or more coordinates of a respective reflecting region, the additional one or more velocity values and the additional one or more coordinates being obtained for a second sensing frame different from the first sensing frame; and determining, based on the obtained plurality of additional return points, that the initial set comprises the first set of the return points corresponding to the first object and the second set of the return points corresponding to the second object.

15. A system comprising:

a sensing system of an autonomous vehicle (AV), the sensing system to:

obtain a plurality of return points, each return point comprising one or more velocity values and one or more coordinates of a reflecting region that reflects a signal emitted by the sensing system, the one or more velocity values and the one or more coordinates obtained for a same first sensing frame; and a perception system of the AV, the perception system to:

identify, using a processing device of the perception system, in view of a distance in a coordinate-velocity space from each of a first set of the return points of the plurality of return points to at least one reference point in the coordinate-velocity space, that the first set of the return points is associated with a first object in an environment of the AV; and cause a driving path of the AV to be determined in view of the first object.

16. The system of claim 15, wherein the sensing system comprises a coherent light detection and ranging device (lidar) and wherein the signal emitted by the sensing system comprises a phase-modulated or a frequency-modulated electromagnetic wave.

17. The system of claim 15, wherein the one or more velocity values comprise a first velocity value obtained using a first sensor of the sensing system and a second velocity value obtained using a second sensor of the sensing system, wherein the second sensor is located differently from the first sensor.

18. The system of claim 15, wherein to identify that the first set of the return points is associated with the first object, the perception system is to:

identify the first set of the return points as a first cluster in the coordinate-velocity space, wherein identifying the first set of the return points as the cluster in the coordinate-velocity space comprises using a clustering criterion.

19. The system of claim 18, wherein the clustering criterion is based, at least in part, on distances in the coordinate-velocity space from each of the first set of return points to the reference point in the coordinate-velocity space, the reference point being associated with a centroid of the first cluster.

20. A non-transitory computer-readable medium having instructions stored thereon that, when executed by a computing device, cause the computing device to:

obtain, from a sensing system of an autonomous vehicle (AV), a plurality of return points, each return point comprising one or more velocity values and one or more coordinates of a reflecting region that reflects a signal emitted by the sensing system, the one or more velocity values and the one or more coordinates obtained for a same first sensing frame;

identify, in view of a distance in a coordinate-velocity space from each of a first set of the return points of the plurality of return points to at least one reference point in the coordinate-velocity space, that the first set of the return points is associated with a first object in an environment of the AV; and cause a driving path of the AV to be determined in view of the first object.

\* \* \* \* \*